US008660200B2

(12) United States Patent
Patel et al.

(10) Patent No.: US 8,660,200 B2
(45) Date of Patent: Feb. 25, 2014

(54) DUAL-PASS JOINT CHANNEL ESTIMATION AND DATA DEMODULATION FOR OFDM SYSTEMS

(76) Inventors: Bhaskar Patel, San Clemente, CA (US); Arumugam Govindswamy, Irvine, CA (US)

( * ) Notice: Subject to any disclaimer, the term of this patent is extended or adjusted under 35 U.S.C. 154(b) by 990 days.

(21) Appl. No.: 12/228,732

(22) Filed: Aug. 15, 2008

(65) Prior Publication Data

US 2010/0040156 A1 Feb. 18, 2010

Related U.S. Application Data

(60) Provisional application No. 60/964,709, filed on Aug. 15, 2007.

(51) Int. Cl.
*H04B 7/02* (2006.01)
*H04L 1/02* (2006.01)

(52) U.S. Cl.
USPC .......................... 375/267; 375/229; 375/316

(58) Field of Classification Search
USPC .................. 375/260, 267, 316, 229
See application file for complete search history.

(56) References Cited

U.S. PATENT DOCUMENTS

| 6,141,393 | A  | * | 10/2000 | Thomas et al. ............... 375/347 |
|-----------|----|---|---------|--------------------------------------|
| 7,180,965 | B2 | * | 2/2007  | Eilts et al. .................... 375/340 |
| 7,248,559 | B2 | * | 7/2007  | Ma et al. ...................... 370/208 |
| 7,532,689 | B2 | * | 5/2009  | Ji et al. ......................... 375/347 |
| 7,706,459 | B2 | * | 4/2010  | Mudulodu et al. ............ 375/260 |
| 7,773,449 | B2 | * | 8/2010  | Kwack .................... 365/230.03 |
| 8,130,848 | B2 | * | 3/2012  | Song et al. .................... 375/260 |
| 2006/0285599 | A1 | * | 12/2006 | Seki et al. .................... 375/260 |
| 2008/0101489 | A1 | * | 5/2008  | Wang et al. ................... 375/260 |

* cited by examiner

*Primary Examiner* — Chieh M Fan
*Assistant Examiner* — Freshteh N Aghdam
(74) *Attorney, Agent, or Firm* — Lerner, David, Littenberg, Krumholz & Mentlik, LLP

(57) ABSTRACT

The present invention provides architectures and methods which implement dual-pass joint channel estimation and data demodulation in communication systems to provide enhanced performance of the communication link. While not limited to any particular communication protocol, such architectures and methods are particularly beneficial in OFDM systems. Channel estimates may be performed using reference symbols and demodulated data symbols according to certain patterns of subcarriers for OFDM symbols. The channel estimates obtained from different patterns may be combined for dual-pass channel estimate which may have reduced estimation error. Such a procedure enables more accurate channel estimation and improved data demodulation, thereby enhancing system performance.

25 Claims, 25 Drawing Sheets

FIG. 12

| Subcarrier for which the Dual-Pass channel estimation is performed | Available channel estimates to perform the channel estimate | Initial channel estimate of subcarrier | Updated channel estimate of subcarrier |
|---|---|---|---|
| sc4 | $h_5$ | $h^*_{p1,4}$ | $h_{p1,4}$ |
| sc6 | $h_5, h_{p1,4}$ | $h^*_{p1,6}$ | $h_{p1,6}$ |
| sc3 | $h_5, h_{p1,4}, h_{p1,6}$ | $h^*_{p1,3}$ | $h_{p1,3}$ |
| sc7 | $h_5, h_{p1,4}, h_{p1,6}, h_{p1,3}$ | $h^*_{p1,7}$ | $h_{p1,7}$ |
| sc2 | $h_5, h_{p1,4}, h_{p1,6}, h_{p1,3}, h_{p1,7}$ | $h^*_{p1,2}$ | $h_{p1,2}$ |
| sc8 | $h_5, h_{p1,4}, h_{p1,6}, h_{p1,3}, h_{p1,7}, h_{p1,2}$ | $h^*_{p1,8}$ | $h_{p1,8}$ |
| sc1 | $h_5, h_{p1,4}, h_{p1,6}, h_{p1,3}, h_{p1,7}, h_{p1,2}, h_{p1,8}$ | $h^*_{p1,1}$ | $h_{p1,1}$ |
| sc9 | $h_5, h_{p1,4}, h_{p1,6}, h_{p1,3}, h_{p1,7}, h_{p1,2}, h_{p1,8}, h_{p1,1}$ | $h^*_{p1,9}$ | - |

FIG. 13

| Subcarrier for which the Dual-Pass channel estimation is performed | Available channel estimates to perform the channel estimate | Initial channel estimate of subcarrier | Updated channel estimate of subcarrier |
|---|---|---|---|
| sc6 | $h_5$ | $\hat{h}_{p2,6}$ | $h_{p2,6}$ |
| sc4 | $h_5, h_{p2,6}$ | $\hat{h}_{p2,4}$ | $h_{p2,4}$ |
| sc7 | $h_5, h_{p2,6}, h_{p2,4}$ | $\hat{h}_{p2,7}$ | $h_{p2,7}$ |
| sc3 | $h_5, h_{p2,6}, h_{p2,4}, h_{p2,7}$ | $\hat{h}_{p2,3}$ | $h_{p2,3}$ |
| sc8 | $h_5, h_{p2,6}, h_{p2,4}, h_{p2,7}, h_{p2,3}$ | $\hat{h}_{p2,8}$ | $h_{p2,8}$ |
| sc2 | $h_5, h_{p2,6}, h_{p2,4}, h_{p2,7}, h_{p2,3}, h_{p2,8}$ | $\hat{h}_{p2,2}$ | $h_{p2,2}$ |
| sc9 | $h_5, h_{p2,6}, h_{p2,4}, h_{p2,7}, h_{p2,3}, h_{p2,8}, h_{p2,2}$ | $\hat{h}_{p2,9}$ | $h_{p2,9}$ |
| sc1 | $h_5, h_{p2,6}, h_{p2,4}, h_{p2,7}, h_{p2,3}, h_{p2,8}, h_{p2,2}, h_{p2,9}$ | $\hat{h}_{p2,1}$ | - |

FIG. 15

| Subcarrier for which the Dual-Pass channel estimation is performed | Available channel estimates to perform the channel estimate | Initial channel estimate of subcarrier | Updated channel estimate of subcarrier |
|---|---|---|---|
| sc8 | $h_5, h_9$ | $h'_{p1,8}$ | $h_{p1,8}$ |
| sc6 | $h_5, h_9, h_{p1,8}$ | $h'_{p1,6}$ | $h_{p1,6}$ |
| sc7 | $h_5, h_9, h_{p1,8}, h_{p1,6}$ | $h'_{p1,7}$ | $h_{p1,7}$ |
| sc10 | $h_5, h_9, h_{p1,8}, h_{p1,6}, h_{p1,7}$ | $h'_{p1,10}$ | $h_{p1,10}$ |
| sc4 | $h_5, h_9, h_{p1,8}, h_{p1,6}, h_{p1,7}, h_{p1,10}$ | $h'_{p1,4}$ | $h_{p1,4}$ |
| sc11 | $h_5, h_9, h_{p1,8}, h_{p1,6}, h_{p1,7}, h_{p1,10}, h_{p1,4}$ | $h'_{p1,11}$ | $h_{p1,11}$ |
| sc3 | $h_5, h_9, h_{p1,8}, h_{p1,6}, h_{p1,7}, h_{p1,10}, h_{p1,4}, h_{p1,11}$ | $h'_{p1,3}$ | $h_{p1,3}$ |
| sc12 | $h_5, h_9, h_{p1,8}, h_{p1,6}, h_{p1,7}, h_{p1,10}, h_{p1,4}, h_{p1,11}, h_{p1,3}$ | $h'_{p1,12}$ | $h_{p1,12}$ |
| sc2 | $h_5, h_9, h_{p1,8}, h_{p1,6}, h_{p1,7}, h_{p1,10}, h_{p1,4}, h_{p1,11}, h_{p1,3}, h_{p1,12}$ | $h'_{p1,2}$ | $h_{p1,2}$ |
| sc13 | $h_5, h_9, h_{p1,8}, h_{p1,6}, h_{p1,7}, h_{p1,10}, h_{p1,4}, h_{p1,11}, h_{p1,3}, h_{p1,12}, h_{p1,2}$ | $h'_{p1,13}$ | $h_{p1,13}$ |
| sc1 | $h_5, h_9, h_{p1,8}, h_{p1,6}, h_{p1,7}, h_{p1,10}, h_{p1,4}, h_{p1,11}, h_{p1,3}, h_{p1,12}, h_{p1,2}, h_{p1,13}$ | $h'_{p1,1}$ | $h_{p1,1}$ |
| sc14 | $h_5, h_9, h_{p1,8}, h_{p1,6}, h_{p1,7}, h_{p1,10}, h_{p1,4}, h_{p1,11}, h_{p1,3}, h_{p1,12}, h_{p1,2}, h_{p1,13}, h_{p1,1}$ | $h'_{p1,14}$ | - |

FIG. 16

| Subcarrier for which the Dual-Pass channel estimation is performed | Available channel estimates to perform the channel estimate | Initial channel estimate of subcarrier | Updated channel estimate of subcarrier |
|---|---|---|---|
| $sc6$ | $h_5, h_9$ | $h'_{p2,6}$ | $h_{p2,6}$ |
| $sc8$ | $h_5, h_9, h_{p2,6}$ | $h'_{p2,8}$ | $h_{p2,8}$ |
| $sc7$ | $h_5, h_9, h_{p2,6}, h_{p2,8}$ | $h'_{p2,7}$ | $h_{p2,7}$ |
| $sc4$ | $h_5, h_9, h_{p2,6}, h_{p2,8}, h_{p2,7}$ | $h'_{p2,4}$ | $h_{p2,4}$ |
| $sc10$ | $h_5, h_9, h_{p2,6}, h_{p2,8}, h_{p2,7}, h_{p2,4}$ | $h'_{p1,10}$ | $h_{p2,10}$ |
| $sc3$ | $h_5, h_9, h_{p2,6}, h_{p2,8}, h_{p2,7}, h_{p2,4}, h_{p2,10}$ | $h'_{p2,3}$ | $h_{p2,3}$ |
| $sc11$ | $h_5, h_9, h_{p2,6}, h_{p2,8}, h_{p2,7}, h_{p2,4}, h_{p2,10}, h_{p2,3}$ | $h'_{p2,11}$ | $h_{p2,11}$ |
| $sc2$ | $h_5, h_9, h_{p2,6}, h_{p2,8}, h_{p2,7}, h_{p2,4}, h_{p2,10}, h_{p2,3}, h_{p2,11}$ | $h'_{p2,2}$ | $h_{p2,2}$ |
| $sc12$ | $h_5, h_9, h_{p2,6}, h_{p2,8}, h_{p2,7}, h_{p2,4}, h_{p2,10}, h_{p2,3}, h_{p2,11}, h_{p2,2}$ | $h'_{p2,12}$ | $h_{p2,12}$ |
| $sc1$ | $h_5, h_9, h_{p2,6}, h_{p2,8}, h_{p2,7}, h_{p2,4}, h_{p2,10}, h_{p2,3}, h_{p2,11}, h_{p2,2}, h_{p2,12}$ | $h'_{p2,1}$ | $h_{p2,1}$ |
| $sc13$ | $h_5, h_9, h_{p2,6}, h_{p2,8}, h_{p2,7}, h_{p2,4}, h_{p2,10}, h_{p2,3}, h_{p2,11}, h_{p2,2}, h_{p2,12}, h_{p2,1}$ | $h'_{p2,13}$ | $h_{p2,13}$ |
| $sc14$ | $h_5, h_9, h_{p2,6}, h_{p2,8}, h_{p2,7}, h_{p2,4}, h_{p2,10}, h_{p2,3}, h_{p2,11}, h_{p2,2}, h_{p2,12}, h_{p2,1}, h_{p2,13}$ | $h'_{p2,14}$ | - |

FIG. 18

| Subcarrier for which Dual-Pass channel estimation performed | Available channel estimates to perform the channel estimate | Initial Channel Estimate of the subcarrier | Updated Channel Estimate of the subcarrier |
|---|---|---|---|
| $sc21$ | $h_5, h_9, h_{15}, h_{27}$ | $h'_{p1,21}$ | $h_{p1,21}$ |
| $sc7$ | $h_5, h_9, h_{15}, h_{27}, h_{p1,21}$ | $h'_{p1,7}$ | $h_{p1,7}$ |
| $sc20$ | $h_5, h_9, h_{15}, h_{27}, h_{p1,21}, h_{p1,7}$ | $h'_{p1,20}$ | $h_{p1,20}$ |
| $sc6$ | $h_5, h_9, h_{15}, h_{27}, h_{p1,21}, h_{p1,7}, h_{20}$ | $h'_{p1,6}$ | $h_{p1,6}$ |
| $sc22$ | $h_5, h_9, h_{15}, h_{27}, h_{p1,21}, h_{p1,7}, h_{p1,20}, h_{p1,6}$ | $h'_{p1,22}$ | $h_{p1,22}$ |
| $sc8$ | $h_5, h_9, h_{15}, h_{27}, h_{p1,21}, h_{p1,7}, h_{p1,20}, h_{p1,6}, h_{p1,22}$ | $h'_{p1,8}$ | $h_{p1,8}$ |
| $sc19$ | $h_5, h_9, h_{15}, h_{27}, h_{p1,21}, h_{p1,7}, h_{p1,20}, h_{p1,6}, h_{p1,22}, h_{p1,8}$ | $h'_{p1,19}$ | $h_{p1,19}$ |
| $sc23$ | $h_5, h_9, h_{15}, h_{27}, h_{p1,21}, h_{p1,7}, h_{p1,20}, h_{p1,6}, h_{p1,22}, h_{p1,8}, h_{p1,19}$ | $h'_{p1,23}$ | $h_{p1,23}$ |
| $sc18$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}$ | $h'_{p1,18}$ | $h_{p1,18}$ |
| $sc4$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}$ | $h'_{p1,4}$ | $h_{p1,4}$ |
| $sc24$ | $h_5, h_9, h_{15}, h_{27}, h_{p1,21}, h_{p1,7}, h_{p1,20}, h_{p1,6}, h_{p1,22}, h_{p1,8}, h_{1,19}, h_{1,23}, h_{p1,18}, h_{p1,4}$ | $h'_{p1,24}$ | $h_{p1,24}$ |
| $sc10$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}$ | $h'_{p1,10}$ | $h_{p1,10}$ |
| $sc17$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}$ | $h'_{p1,17}$ | $h_{p1,17}$ |
| $sc3$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}$ | $h'_{p1,3}$ | $h_{p1,3}$ |
| $sc25$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}$ | $h'_{p1,25}$ | $h_{p1,25}$ |
| $sc11$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}$ | $h'_{p1,11}$ | $h_{p1,11}$ |
| $sc16$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}$ | $h'_{p1,16}$ | $h_{p1,16}$ |
| $sc2$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}, h_{p1,16}$ | $h'_{p1,2}$ | $h_{p1,2}$ |
| $sc26$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}, h_{p1,16}, h_{p1,2}$ | $h'_{p1,26}$ | $h_{p1,26}$ |

FIG. 18
Continued

| Subcarrier for which Dual-Pass channel estimation performed | Available channel estimates to perform the channel estimate | Initial Channel Estimate of the subcarrier | Updated Channel Estimate of the subcarrier |
|---|---|---|---|
| $sc12$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}, h_{p1,16}, h_{p1,2}, h_{p1,26}$ | $h'_{p1,12}$ | $h_{p1,12}$ |
| $sc1$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}, h_{p1,16}, h_{p1,2}, h_{p1,26}, h_{p1,12}$ | $h'_{p1,1}$ | $h_{p1,1}$ |
| $sc13$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}, h_{p1,16}, h_{p1,2}, h_{p1,26}, h_{p1,12}, h_{p1,1}$ | $h'_{p1,13}$ | $h_{p1,13}$ |
| $sc28$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}, h_{p1,16}, h_{p1,2}, h_{p1,26}, h_{p1,12}, h_{p1,1}, h_{p1,13}$ | $h'_{p1,28}$ | $h_{p1,28}$ |
| $sc14$ | $h_5, h_9, h_{15}, h_{27}, h_{p1,21}, h_{p1,7}, h_{p1,20}, h_{p1,6}, h_{p1,22}, h_{p1,8}, h_{p1,19}, h_{p1,23}, h_{p1,18}, h_{p1,4}, h_{p1,24}, h_{p1,10}, h_{p1,17}, h_{p1,3}, h_{p1,25}, h_{p1,11}, h_{p1,16}, h_{p1,2}, h_{p1,26}, h_{p1,12}, h_{p1,1}, h_{p1,13}, h_{p1,28}$ | $h'_{p1,14}$ | $h_{p1,14}$ |

FIG. 19

| Subcarrier for which the Dual-Pass channel estimation is performed | Available channel estimates to perform the channel estimate | Initial Channel Estimate of the subcarrier | Updated Channel Estimate of the subcarrier |
|---|---|---|---|
| $sc7$ | $h_5, h_9, h_{15}, h_{27}$ | $h'_{p2,7}$ | $h_{p2,7}$ |
| $sc21$ | $h_5, h_9, h_{15}, h_{27}, h_{p2,7}$ | $h'_{p2,21}$ | $h_{p2,21}$ |
| $sc8$ | $h_5, h_9, h_{15}, h_{27}, h_{p2,7}, h_{p2,21}$ | $h'_{p2,8}$ | $h_{p2,8}$ |
| $sc22$ | $h_5, h_9, h_{15}, h_{27}, h_{p2,7}, h_{p2,21}, h_{p2,8}$ | $h'_{p2,22}$ | $h_{p2,22}$ |
| $sc6$ | $h_5, h_9, h_{15}, h_{27}, h_{p2,7}, h_{p2,21}, h_{p2,8}, h_{p2,22}$ | $h'_{p2,6}$ | $h_{p2,6}$ |
| $sc20$ | $h_5, h_9, h_{15}, h_{27}, h_{p2,7}, h_{p2,21}, h_{p2,8}, h_{p2,22}, h_{p2,6}$ | $h'_{p2,20}$ | $h_{p2,20}$ |
| $sc23$ | $h_5, h_9, h_{15}, h_{27}, h_{p2,7}, h_{p2,21}, h_{p2,8}, h_{p2,22}, h_{p2,6}, h_{p2,20}$ | $h'_{p2,23}$ | $h_{p2,23}$ |
| $sc19$ | $h_5, h_9, h_{15}, h_{27}, h_{p2,7}, h_{p2,21}, h_{p2,8}, h_{p2,22}, h_{p2,6}, h_{p2,20}, h_{p2,23}$ | $h'_{p2,19}$ | $h_{p2,19}$ |
| $sc10$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}$ | $h'_{p2,10}$ | $h_{p2,10}$ |
| $sc24$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}$ | $h'_{p2,24}$ | $h_{p2,24}$ |
| $sc4$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}$ | $h'_{p2,4}$ | $h_{p2,4}$ |
| $sc18$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}$ | $h'_{p2,18}$ | $h_{p2,18}$ |
| $sc11$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}$ | $h'_{p2,11}$ | $h_{p2,11}$ |
| $sc25$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}$ | $h'_{p2,25}$ | $h_{p2,25}$ |
| $sc3$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}$ | $h'_{p2,3}$ | $h_{p2,3}$ |
| $sc17$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}$ | $h'_{p2,17}$ | $h_{p2,17}$ |
| $sc12$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}$ | $h'_{p2,12}$ | $h_{p2,12}$ |
| $sc26$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}, h_{p2,12}$ | $h'_{p2,26}$ | $h_{p2,26}$ |

FIG. 19
Continued

| Subcarrier for which the Dual-Pass channel estimation is performed | Available channel estimates to perform the channel estimate | Initial Channel Estimate of the subcarrier | Updated Channel Estimate of the subcarrier |
|---|---|---|---|
| $sc2$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}, h_{p2,12}, h_{p2,26}$ | $h'_{p2,2}$ | $h_{p2,2}$ |
| $sc16$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}, h_{p2,12}, h_{p2,26}, h_{p2,2}$ | $h'_{p2,16}$ | $h_{p2,16}$ |
| $sc13$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}, h_{p2,12}, h_{p2,26}, h_{p2,2}, h_{p2,16}$ | $h'_{p2,13}$ | $h_{p2,13}$ |
| $sc1$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}, h_{p2,12}, h_{p2,26}, h_{p2,2}, h_{p2,16}, h_{p2,13}$ | $h'_{p2,1}$ | $h_{p2,1}$ |
| $sc14$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}, h_{p2,12}, h_{p2,26}, h_{p2,2}, h_{p2,16}, h_{p2,13}, h_{p2,1}$ | $h'_{p2,14}$ | $h_{p2,14}$ |
| $sc28$ | $h_5, h_9, h_{15}, h_{27}, h_{p2,7}, h_{p2,21}, h_{p2,8}, h_{p2,22}, h_{p2,6}, h_{p2,20}, h_{p2,23}, h_{p2,19}, h_{p2,10}, h_{p2,24}, h_{p2,4}, h_{p2,18}, h_{p2,11}, h_{p2,25}, h_{p2,3}, h_{p2,17}, h_{p2,12}, h_{p2,26}, h_{p2,2}, h_{p2,16}, h_{p2,13}, h_{p2,1}, h_{p2,14}$ | $h'_{p2,28}$ | $h_{p2,28}$ |

DUAL-PASS JOINT CHANNEL ESTIMATION AND DATA DEMODULATION FOR OFDM SYSTEMS

CROSS-REFERENCE TO RELATED APPLICATION

The present application claims the benefit of the filing date of U.S. Provisional Patent Application No. 60/964,709, filed Aug. 15, 2007, and entitled "Dual-Pass Adaptive Channel Estimation for OFDM Systems," the entire disclosure of which is hereby expressly incorporated by reference herein.

BACKGROUND OF THE INVENTION

1. Field of the Invention

The present invention relates generally to digital communication systems and, more particularly, to methods and receiver architectures for channel estimation and data demodulation.

2. Description of Related Art

Quadrature Amplitude Modulation (QAM), Phase Shift Keying (PSK), Binary PSK (BPSK), and Quadrature PSK (QPSK) are some of the commonly used modulation techniques in digital communication systems. The set of all symbols and their arrangement in a modulation technique is referred as a "constellation."

In general, the reference phase and amplitude of the modulation constellation are required at the receiver to estimate the symbols sent by the transmitter. In general, the phase and amplitude of the constellation show random variations due to variety of channel impairments such as fading, frequency response of the channel, frequency offset, timing offset, etc. In coherent detection, the reference phase and amplitude of the modulation constellation may be obtained from reference symbols that may be transmitted along with the data symbols. In non-coherent detection, previously detected symbols may be used as reference symbols for detecting current symbols. In general, coherent detection provides superior performance than non-coherent detection. The overhead in terms of the bandwidth and power allocated for transmitting reference symbols is justified by the improved performance. The process of estimating the phase and amplitude of the channel to demodulate the symbols received on the channel is referred to as channel estimation. The process of compensating the effect of the random phase and amplitude variation by using the estimated channel conditions is referred to as equalization.

Orthogonal frequency division multiplexing (OFDM) is a multi-carrier modulation scheme used in many digital communication systems. In OFDM, a large number of closely spaced orthogonal subcarriers are used to transmit data as shown in FIG. 1. The data are divided into several parallel data streams, one for each subcarrier. Each subcarrier is modulated with a conventional modulation scheme such as QAM, PSK, BPSK, or QPSK, at a low symbol rate while maintaining total data rate similar to single carrier modulation schemes in the same channel bandwidth. The frequency spacing between two adjacent subcarriers is referred as subcarrier spacing and it is denoted by $\Delta f$. The rate at which the individual subcarriers are modulated is referred as symbol rate. The collection of all the subcarriers is referred as an OFDM symbol. The OFDM symbol rate is the same as the data symbol rate on each individual subcarrier. The OFDM symbol duration is denoted by $T_u$. The OFDM signal is typically generated in frequency domain and then converted in time domain. An OFDM signal over one symbol duration is referred as an OFDM symbol in both time domain and frequency domain. Additional details about OFDM may be found in "3G Evolution: HSPA and LTE for Mobile Broadband" by Dahlman, Parkvall, Sköld and Beming, published by Academic Press, 1st Edition© 2007, the entire disclosure of which is hereby expressly incorporated by reference herein.

The primary advantage of OFDM over single carrier modulation schemes is its ability to cope with severe channel conditions such as attenuation of high frequencies in a channel, narrowband interference and frequency selective fading due to multipath without requiring complex equalization filters. Channel equalization is simplified because OFDM may be viewed as using many slowly modulated narrowband signals rather than one rapidly modulated wideband signal. The low symbol rate makes the use of a guard interval between OFDM symbols affordable, making it possible to handle time spreading and eliminate intersymbol interference (ISI).

Low complexity implementation by means of computationally efficient Fast Fourier Transform (FFT) is possible for OFDM systems due to its specific structure and the selection of a subcarrier spacing $\Delta f$ equal to the reciprocal of OFDM symbol rate $T_u$.

An uncorrupted OFDM signal can be demodulated without any interference between subcarriers. The subcarrier orthogonality is due to the fact that a modulated subcarrier consists of an integer number of periods of complex exponentials during the OFDM symbol interval $T_u = 1/\Delta f$. However, in case of a time dispersive channel the orthogonality between the subcarriers may be lost. The reason for this loss of subcarrier orthogonality is that the OFDM symbol boundary for one path will overlap with the symbol boundary of a different path, as illustrated in FIG. 2. As a consequence, in case of a time dispersive channel there will be intersymbol interference within a subcarrier and interference between subcarriers.

Cyclic prefix insertion is typically used in OFDM to address the loss of orthogonality in time dispersive channels and to make an OFDM signal robust to time dispersion on the radio channel. As illustrated in FIG. 3, cyclic prefix insertion is performed by copying the last portion of the OFDM symbol and inserting it at the beginning of the OFDM symbol.

Cyclic prefix insertion is beneficial in the sense that it makes an OFDM signal robust to time dispersion as long as the span of the time dispersion does not exceed the length of the cyclic prefix. The drawback of cyclic prefix insertion is that only a fraction $T_u/(T_u + T_{CP})$ of the received signal power is actually utilized by the OFDM demodulator. Cyclic prefix insertion also reduces the OFDM symbol rate from $1/T_u$ to $1/(T_u + T_{CP})$.

At the receiver side, the samples corresponding to cyclic prefix are discarded before FFT processing. Assuming a sufficiently large cyclic prefix, the linear convolution of a time dispersive radio channel will appear as a circular convolution during the OFDM symbol interval $T_u$. The combination of OFDM modulation (Inverse FFT (IFFT) processing), a time dispersive radio channel, and OFDM demodulation (FFT processing) can then be seen as a frequency domain channel as illustrated in FIG. 4, where the frequency domain channel taps $h_0, \ldots, h_{N-1}$ can be directly derived from the channel impulse response, where N is the number of subcarriers used in an OFDM symbol.

The output $r_{n,k}$ of the $k^{th}$ subcarrier at the receiver in FIG. 4 is the transmitted modulation symbol $x_{n,k}$ scaled and phase rotated by the complex frequency domain channel tap $h_k$ and impaired by noise $w_k$. To properly recover the transmitted symbol for data demodulation and channel decoding, the receiver should multiply $r_{n,k}$ with the complex conjugate of estimated channel, $\hat{h}_k$, as illustrated in FIG. 5. This is often referred as a one tap frequency domain equalizer being applied to each received subcarrier.

To perform data demodulation, the receiver has to estimate the frequency domain channel taps $h_0, \ldots, h_{N-1}$. The frequency domain channel taps can be estimated by first estimating the channel impulse response and then converting it into frequency domain to estimate $h_0, \ldots, h_{N-1}$. However, frequency domain channel taps may be estimated directly by using known reference symbols, which are inserted by the transmitter at regular intervals within the OFDM time-frequency grid, as illustrated in FIG. 6. The reference symbols are often referred as pilot symbols. The subcarrier on which the pilot symbol is transmitted is referred as pilot subcarrier. The terms pilot, pilot subcarrier, and pilot symbol are used interchangeably herein.

Using a priori information about the reference symbols, the receiver can estimate the frequency domain channel around the location of the reference symbols. The reference symbols should have a sufficiently high density in both the time and the frequency dimensions to be able to provide estimates for the entire time-frequency grid in a variety of channel conditions including radio propagation channels subject to high frequency and/or time selectivity. Different algorithms may be used for the channel estimation, such as averaging, linear interpolation, Minimum Mean Square Error (MMSE) estimation, etc. Some of these algorithms may require knowledge of the channel statistics.

There are several traditional methods for performing channel estimation. One of the commonly used methods is the MMSE channel estimation method. In this method the known channel estimates from the surrounding pilot positions are used to obtain MMSE channel estimate for data subcarriers. The pilots may be used from past and present OFDM symbols. Pilots from future OFDM symbols may also be used if storage and delay are not issues in an application. FIG. 7 illustrates an example of the MMSE channel estimation that uses seven pilots that are closest to the data symbol for which the channel estimate is needed.

Let (n, m) denote a data symbol position on OFDM symbol number n and subcarrier m. In FIG. 7, the initial available channel estimates for estimating a channel at position (9, 7) are the ones at the set of pilot positions as follows:

Set_1={(4, 5) (4, 9), (8, 4), (8, 8), (8, 12), (12, 7), (12, 11)}

Using the channel estimates at the above positions a two-dimensional (2D) channel estimation is performed using a filter whose coefficients are computed according to MMSE criteria using the joint time and frequency correlation of the propagation channel. For example, to compute the channel estimate at data symbol position (9, 7) the coefficient that multiplies the pilot channel estimate at position (4, 5) is proportional to the channel correlation between the position of the pilot (4, 5) and the position of the data symbol (9, 7) whose channel estimate is desired. Similarly, the filter coefficient that multiplies the pilot channel estimate at position (8, 8) is proportional to the channel correlation between the position of the pilot (8, 8) and the position of the data symbol (9, 7) whose channel estimate is desired. For correlated propagation channels clearly there is a stronger channel correlation between positions (8, 8) and (9, 7) compared to correlation between positions (4, 5) and (9, 7). Therefore, depending on signal conditions, typically the pilot channel estimate at position (8, 8) is emphasized heavily in the channel estimation for position (9, 7). For each position within the 2D time-frequency grid, there will be a different set of filter coefficients. However, since the pilot pattern is repetitive, after four OFDM symbols, the same set of filter coefficients will be needed.

The above described MMSE channel estimation method uses pilots from different OFDM symbols and from different subcarriers in those OFDM symbols and therefore it is referred herein as 2D MMSE channel estimation. The 2D MMSE exploits the channel correlation that is typically present along both the time axis and the frequency axis. This type of MMSE estimation is often too complex and therefore lower complexity versions that provide performance close to that of a 2D MMSE estimation are developed in literature. Separable 2D MMSE estimation is one example of commonly used lower complexity channel estimation method. In this method, first the MMSE estimation is performed in one dimension based on the channel correlation in that dimension and then second MMSE is performed in another dimension which in turn exploits the correlation in that dimension.

The channel correlation along the time and the frequency axis can be estimated based on the propagation channel models. Often the time and frequency correlation of the channel can be treated independently and therefore the channel estimation methods that exploit the channel correlation can also be separated. FIG. 8 illustrates an example of a separable 2D channel estimation procedure where 1D filtering is performed along time axis first and then the next 1D filtering is performed along frequency axis. The pilot symbols used in 1D filters along each axis is limited to the pilots available along the axis for which the filtering is being performed. FIG. 9 illustrates the pilots available for 1D filtering along the frequency axis.

There is a tradeoff between the density of pilots and the overhead in terms of portion of the total bandwidth and portion of the total power used up by the reference symbols such as pilots or training symbols. Although greater density of pilots is desirable for improved channel estimation, it takes away portion of the total bandwidth and portion of the total power that could otherwise be used for payload data transmission.

Mobile wireless communication systems operate under very dynamic propagation channel conditions. The propagation channel conditions between the transmitter and the receiver can vary rapidly because of the fast movement of the mobile terminals. Normally in mobile wireless communication systems a larger number of reference symbols are embedded in the transmitted signal to enable receivers to reliably estimate the rapidly varying channel conditions.

Once a communication system is designed with specified reference symbols information, the channel estimation methods in the receiver must be designed to take full advantage of the available reference symbols embedded in the transmitted signal.

In order to reduce the overhead of the reference symbols, some communication systems transmit the reference symbols at the beginning of a connection and then switch to payload data transmission. In this type of scenario, the receiver uses the initial reference (training) symbols to estimate the channel and then use this estimated channel for equalizing data symbols received during payload data transmission mode.

In many communication systems the channel varies over a period of time. Therefore it is necessary for the receiver to continuously track the changes in the channel and adapt the estimated channel. A common approach to track the channel variation is to use the demodulated data symbols as reference symbols for estimating the channel for the next symbol. This is often referred as Decision Directed Channel Estimation or Decision Feedback Equalization (DFE). DFE uses the previously demodulated and/or decoded data symbols for estimating the channel for the present data symbol.

In OFDM systems, each OFDM symbol includes a large number of subcarriers that are individually modulated. The subcarriers that carry payload data are referred herein as data subcarriers and the subcarriers that carry reference symbols are referred herein as pilot subcarriers. The modulation information for the pilot subcarriers may be known a priori. In the absence of pilots in a symbol, the demodulated data symbols from previous OFDM symbols may be used for estimating channel for the present symbol. The position and density of pilots in the time-frequency grid may vary depending on the application and the particular OFDM system under consideration. In a given OFDM system, the position of pilot subcarriers may vary, often in a periodic manner, as a function of the OFDM symbol.

To demodulate the received data symbol on each subcarrier of an OFDM symbol, channel estimation is employed for each of these subcarriers. The channel estimate for one or more of the data subcarriers in the current OFDM symbol may be obtained through pilots in the current OFDM symbol or through previously received pilots and demodulated data symbols. The channel estimate for a given data subcarrier is used to equalize and demodulate the received symbol on the given data subcarrier.

In view of the widespread and ever expanding use of signaling schemes as discussed above, improved channel estimation and data demodulation processes and architectures are desired.

SUMMARY OF THE INVENTION

In accordance with an embodiment of the present invention, a channel estimation and data demodulation method for use in a communication system is provided. The method comprises performing a first channel estimate for a subset of data subcarriers of a symbol received by a receiver in the communication system according to a first pattern; performing a second channel estimate for the subset of data subcarriers of the symbol according to a second pattern, the second pattern being different than the first pattern; obtaining a multi-pass channel estimate for each of the data subcarriers in the subset by combining the first and second channel estimates; equalizing the data subcarriers based on the multi-pass channel estimate thereof; and demodulating the equalized data subcarriers to obtain demodulated data.

In one example, performing the first channel estimate comprises performing a channel estimate for any pilot subcarrier associated with the subset; and obtaining an initial channel estimate for a given one of the data subcarriers according to the first pattern and based on the channel estimate for any associated pilot subcarrier.

In this case, the method may further comprise performing an initial equalization on a data symbol received on the given one of the data subcarriers. In one alternative, the method further comprises performing an initial demodulation of the equalized data symbol and updating the initial channel estimate for the given data subcarrier.

Optionally, performing the second channel estimate comprises obtaining an initial channel estimate for the given one of the data subcarriers according to the second pattern and based on the channel estimate for any associated pilot subcarrier. In this case, the initial channel estimates may be based on at least one of a channel estimate from a prior symbol, a demodulated data symbol from the prior symbol and a pilot subcarrier from the prior symbol.

In another example, the first and second channel estimates are combined by averaging the estimates together. Averaging may be done with a weighted average of the first and second channel estimates.

In an alternative, the subset comprises all of the data subcarriers of the symbol. In a further alternative, the symbol is an OFDM symbol. In yet another alternative, the subset of data subcarriers is selected from the symbol by the receiver. In any of the examples and alternatives herein, the subset of data subcarriers may be selected to span more than one symbol. Furthermore, the symbol may not include any pilot subcarriers.

In yet another example, the method further comprises performing a third channel estimate for the subset of data subcarriers of the symbol according to a third pattern. The third pattern is different than the first and second patterns. In this case, the multi-pass channel estimate for each of the data subcarriers in the subset is obtained by combining the first, second and third channel estimates.

In accordance with another embodiment of the present invention, a recording medium is recorded with a computer program for execution by a processor to perform a channel estimation and data demodulation process in a communication system. The process comprises performing a first channel estimate for a subset of data subcarriers of a symbol in the communication system according to a first pattern; performing a second channel estimate for the subset of data subcarriers of the symbol according to a second pattern, the second pattern being different than the first pattern; obtaining a multi-pass channel estimate for each of the data subcarriers in the subset by combining the first and second channel estimates; equalizing the data subcarriers based on the multi-pass channel estimate thereof; and demodulating the equalized data subcarriers to obtain demodulated data.

In one alternative, performing the first channel estimate comprises performing a channel estimate for any pilot subcarrier associated with the subset and obtaining an initial channel estimate for a given one of the data subcarriers according to the first pattern and based on the channel estimate for any associated pilot subcarrier. In this case, the process may further comprise performing an initial equalization on a data symbol received on the given one of the data subcarriers. Here, the process may also comprise performing an initial demodulation of the equalized data symbol and updating the initial channel estimate for the given data subcarrier.

In a further alternative, performing the second channel estimate comprises obtaining an initial channel estimate for the given one of the data subcarriers according to the second pattern and based on the channel estimate for any associated pilot subcarrier.

In accordance with yet another embodiment of the present invention, a wireless communication device for use on a wireless communication network is provided. The wireless communication device comprises a baseband subsystem and a radio subsystem. The baseband subsystem includes a processor for managing operations of the wireless communication device. The radio frequency subsystem is operatively connected to the baseband subsystem. The radio frequency subsystem includes at least one receive chain operable to receive symbols from at least one channel of the wireless communication network. The processor is operable to perform a first channel estimate for a subset of data subcarriers of one of the symbols according to a first pattern; perform a second channel estimate for the subset of data subcarriers of the symbol according to a second pattern, the second pattern being different than the first pattern; obtain a multi-pass channel estimate for each of the data subcarriers in the subset by combining the first and second channel estimates; equalize the data subcarriers based on the multi-pass channel estimate thereof; and demodulate the equalized data subcarriers to obtain demodulated data.

In one example, the wireless communication network employs an OFDM modulation scheme and the symbols are OFDM symbols. In another example, the device is a mobile station. In a further example, the device is a base station of the wireless communication network.

In an alternative, the processor is further operable to perform the first channel estimate by performing a channel estimate for any pilot subcarrier associated with the subset and obtaining an initial channel estimate for a given one of the data subcarriers according to the first pattern and based on the channel estimate for any associated pilot subcarrier. In this case, the processor may be further operable to perform an initial equalization on a data symbol received on the given one of the data subcarriers. Optionally, the processor is further operable to perform an initial demodulation of the equalized data symbol and update the initial channel estimate for the given data subcarrier.

In a further alternative, the processor is also operable to perform the second channel estimate by obtaining an initial channel estimate for the given one of the data subcarriers according to the second pattern and based on the channel estimate for any associated pilot subcarrier.

BRIEF DESCRIPTION OF THE DRAWINGS

FIG. 12 illustrates a first exemplary pattern for channel estimation with regard to FIG. 11 according to an aspect of the present invention.

FIG. 13 illustrates a second exemplary pattern for channel estimation with regard to FIG. 11 according to an aspect of the present invention.

FIG. 15 illustrates a first exemplary pattern for channel estimation with regard to FIG. 14 according to an aspect of the present invention.

FIG. 16 illustrates another exemplary pattern for channel estimation with regard to FIG. 14 according to an aspect of the present invention.

FIG. 18 illustrates a first exemplary pattern 1 for channel estimation with regard to FIG. 17 according to an aspect of the present invention.

FIG. 19 illustrates another exemplary pattern for channel estimation with regard to FIG. 17 according to an aspect of the present invention.

DETAILED DESCRIPTION

Figure 1:
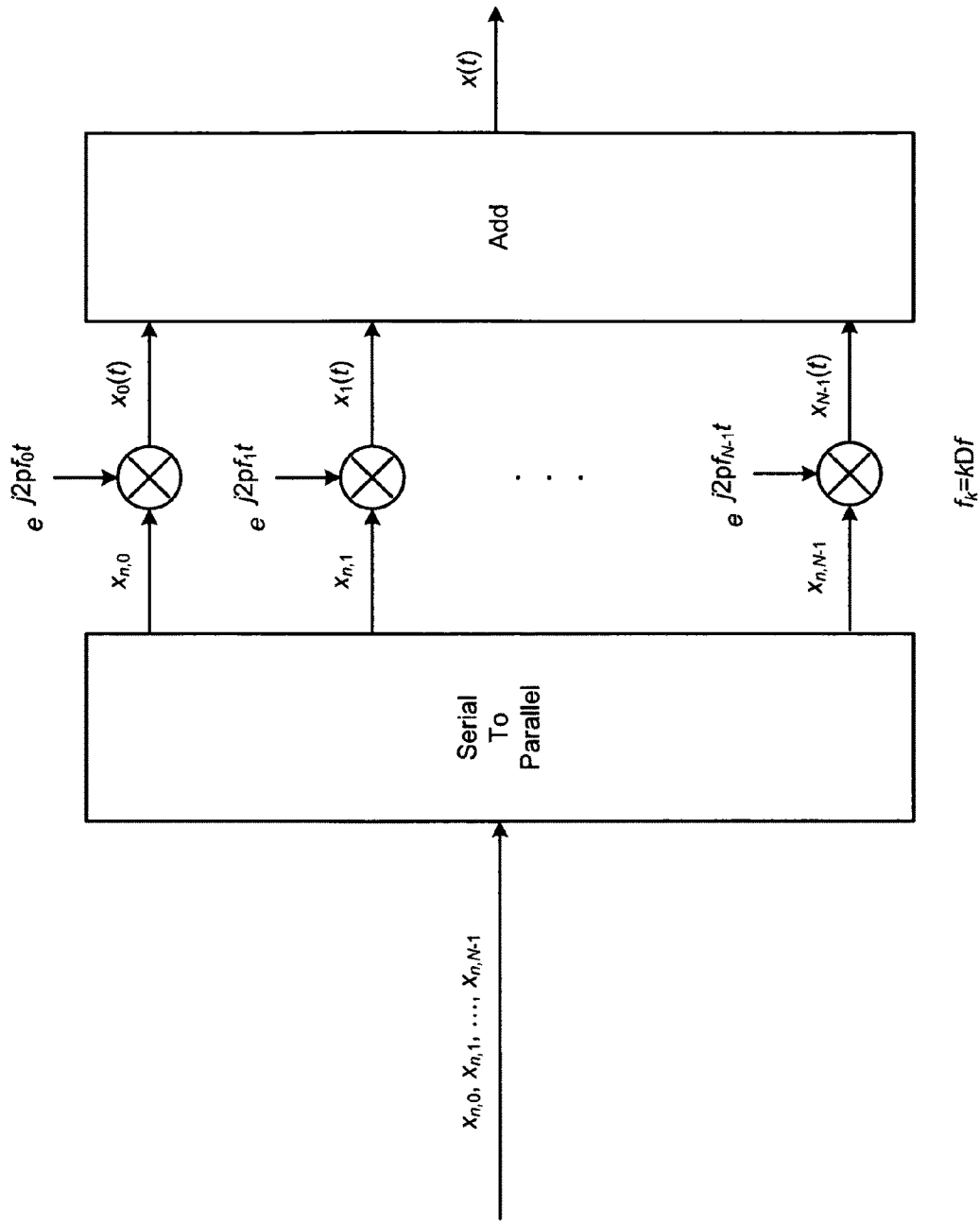
FIG. 1 illustrates a conventional OFDM communication system.
Figure 2:
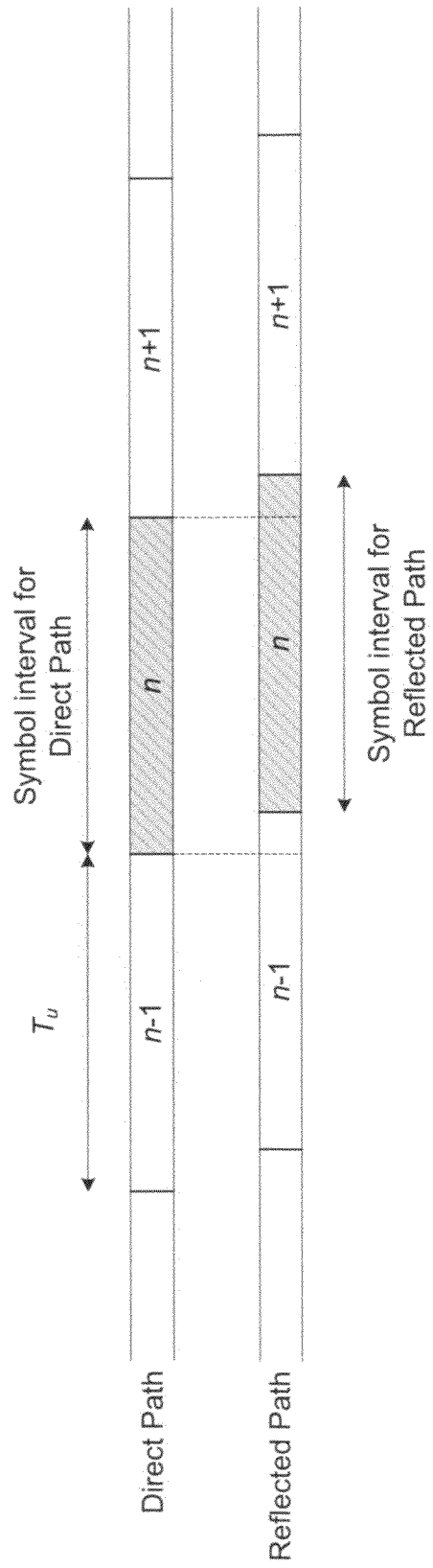
FIG. 2 illustrates the effect of time dispersion on the orthogonality of the subcarriers in an OFDM communication system.
Figure 3:
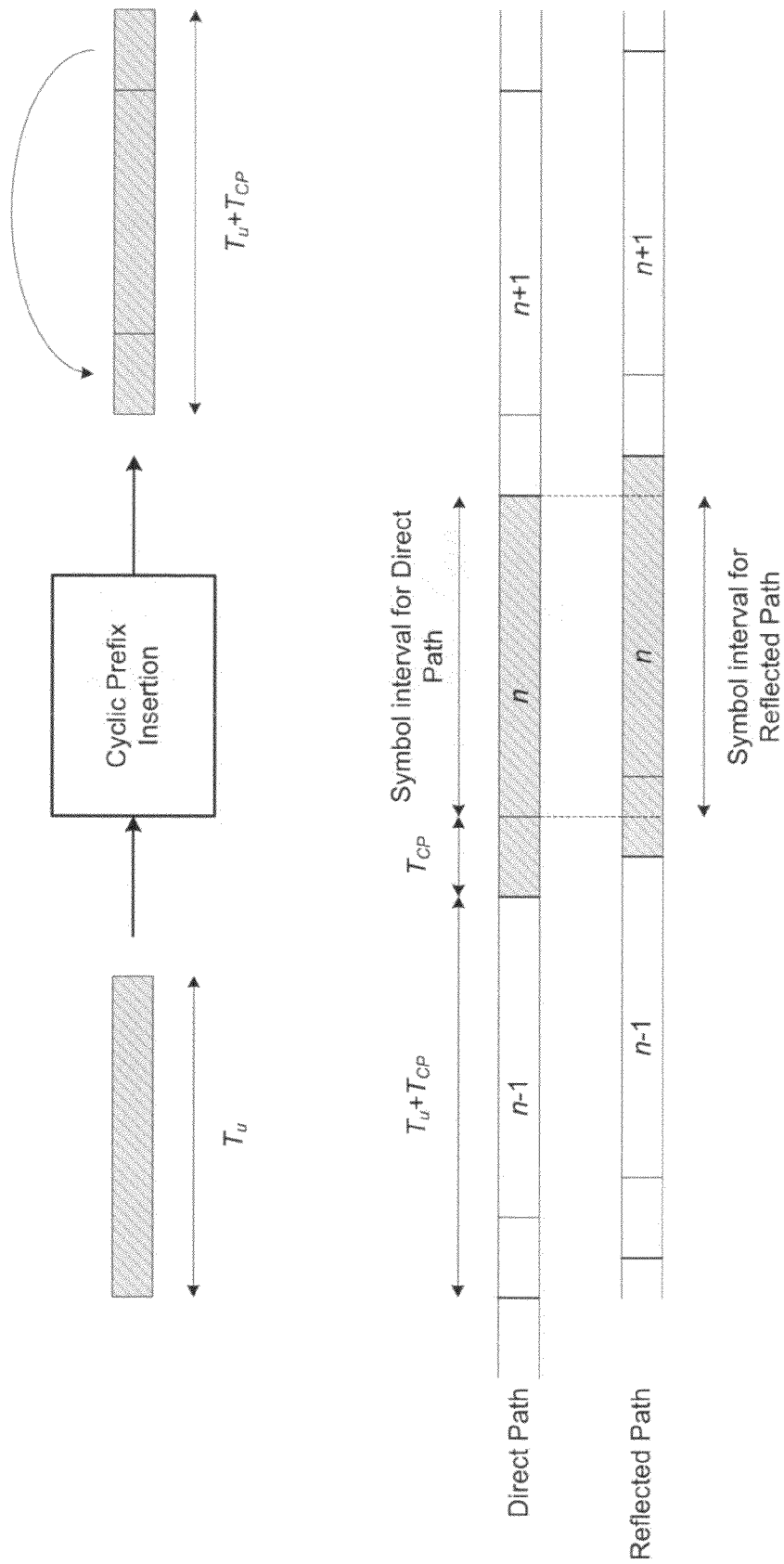
FIG. 3 illustrates how cyclic prefix can help maintain the orthogonality of the subcarriers in an OFDM communication system.
Figure 4:
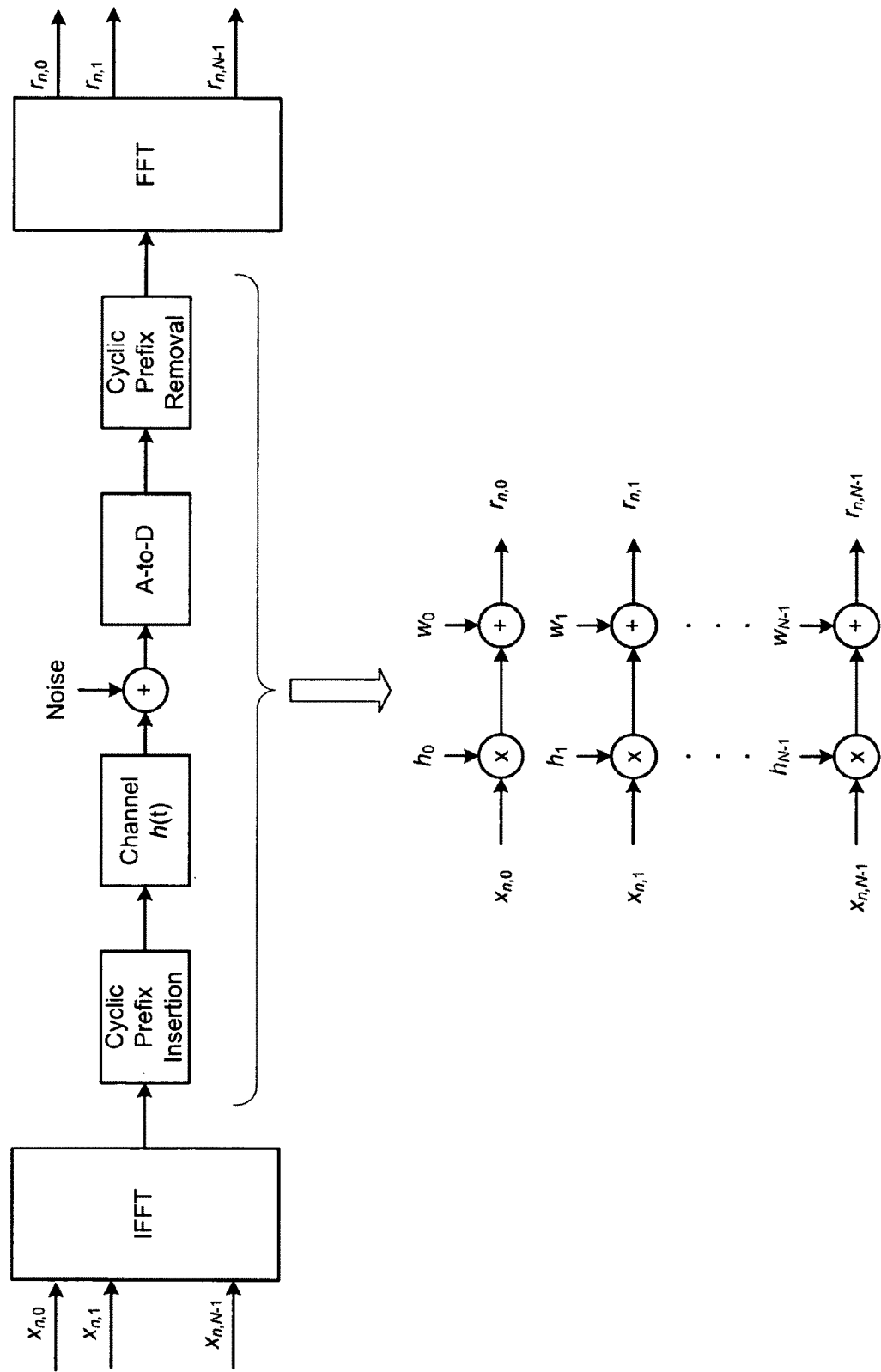
FIG. 4 illustrates a time domain and frequency domain model of an OFDM communication system.
Figure 5:
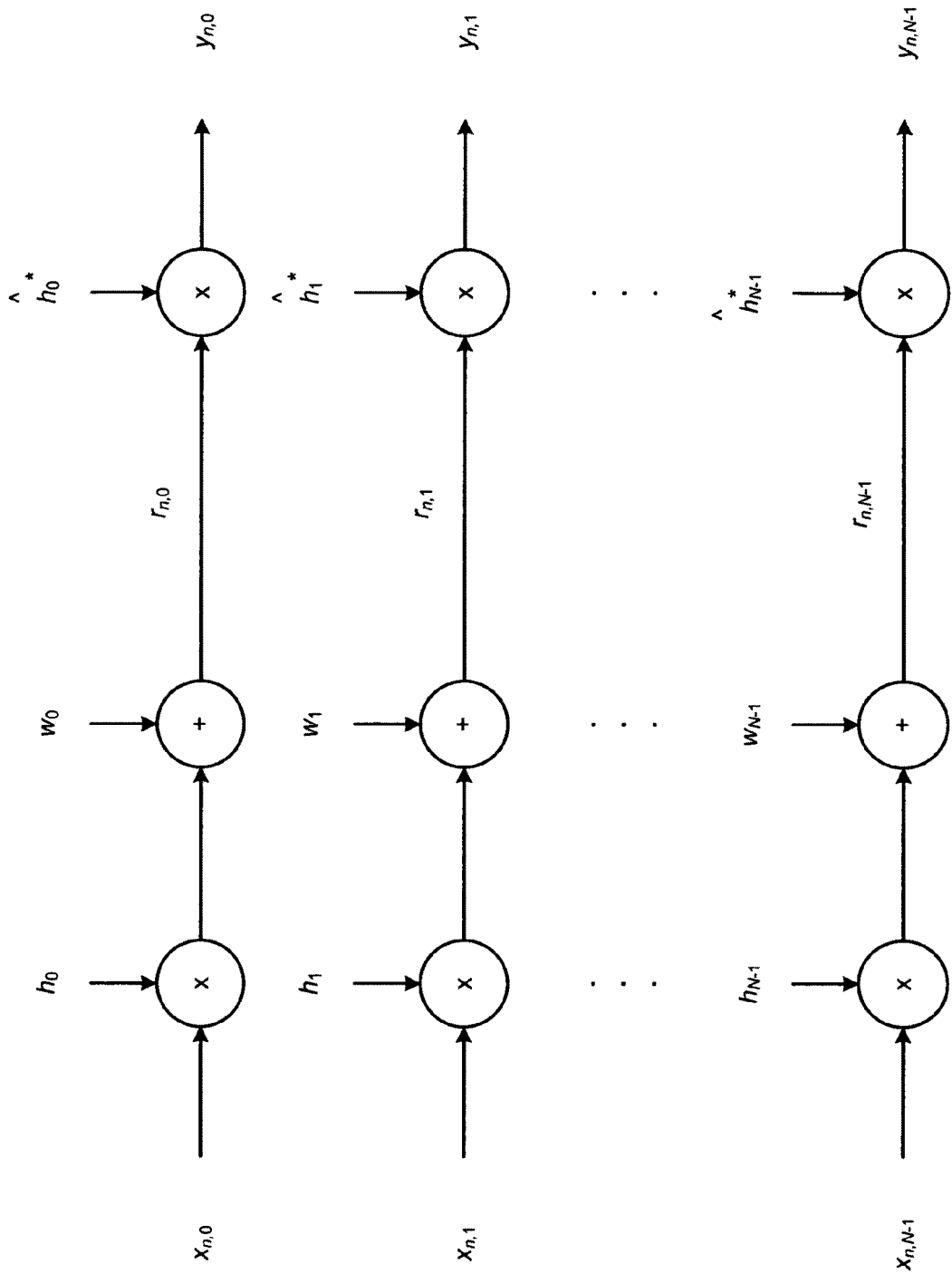
FIG. 5 illustrates the frequency domain model of an OFDM communication system and the equalization at the receiver.
Figure 6:
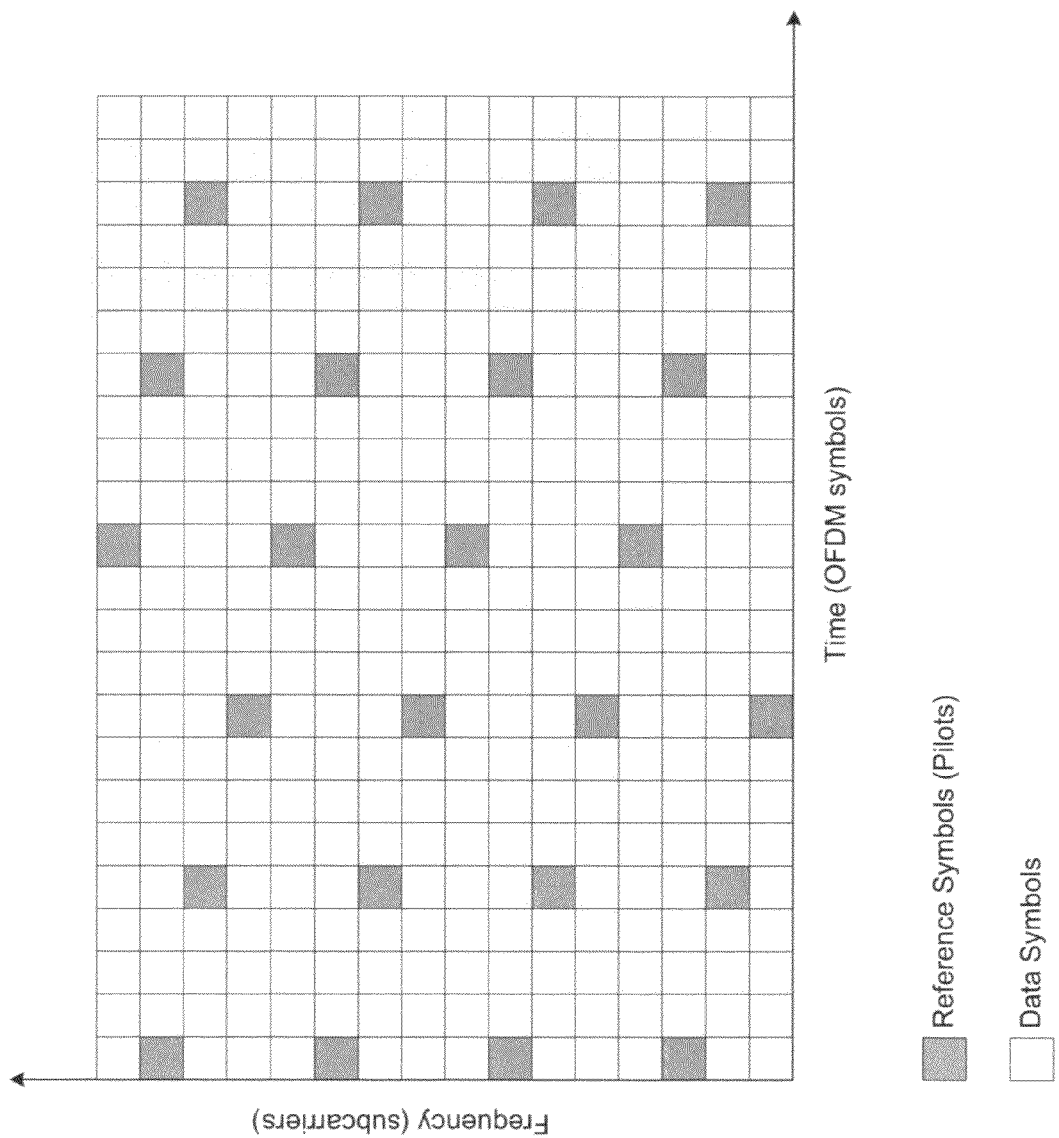
FIG. 6 illustrates an example arrangement of data and reference symbols in a time-frequency grid representation of an OFDM communication system.
Figure 7:
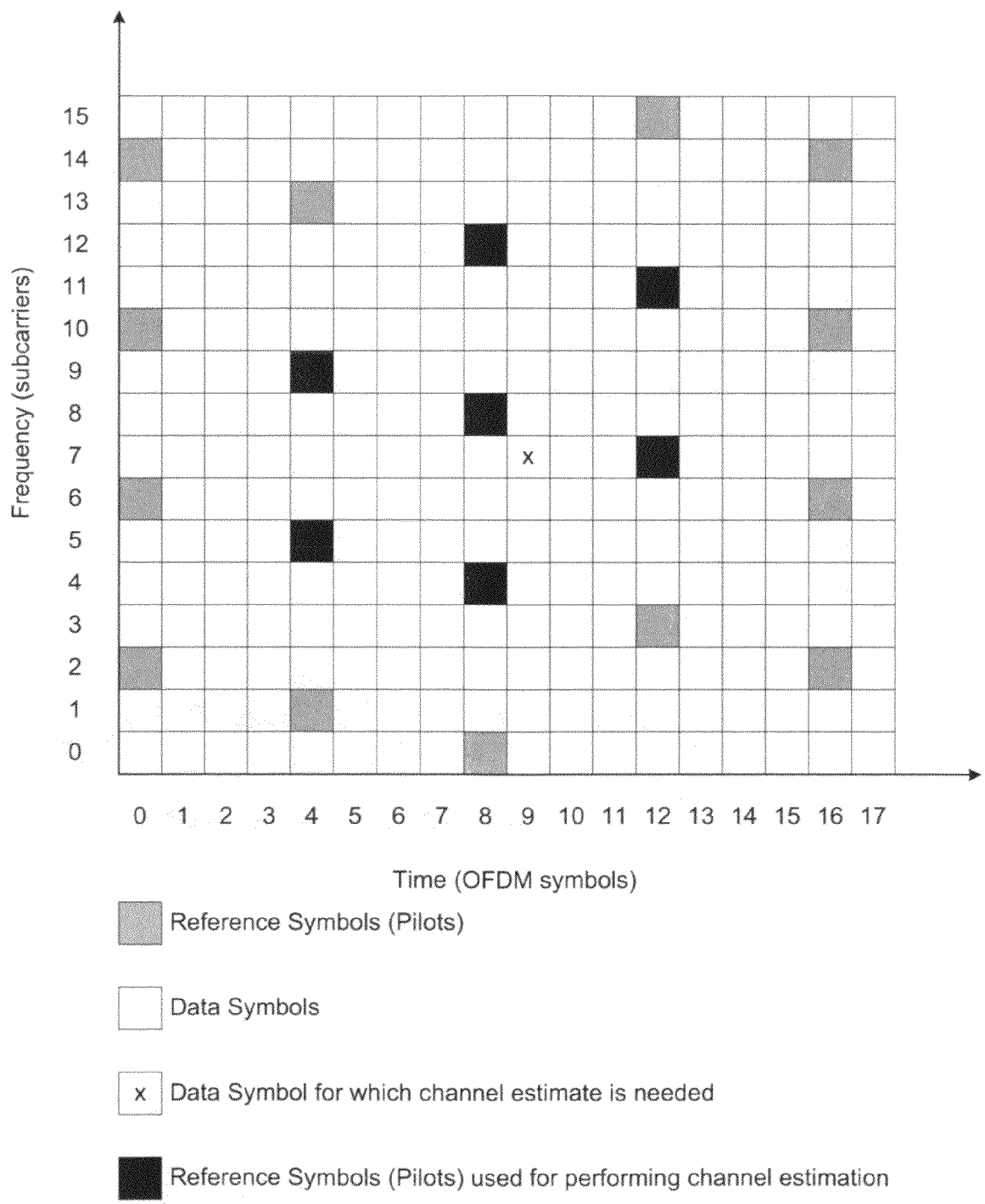
FIG. 7 illustrates 2D channel estimation in a time-frequency grid of an OFDM communication system.
Figure 8:
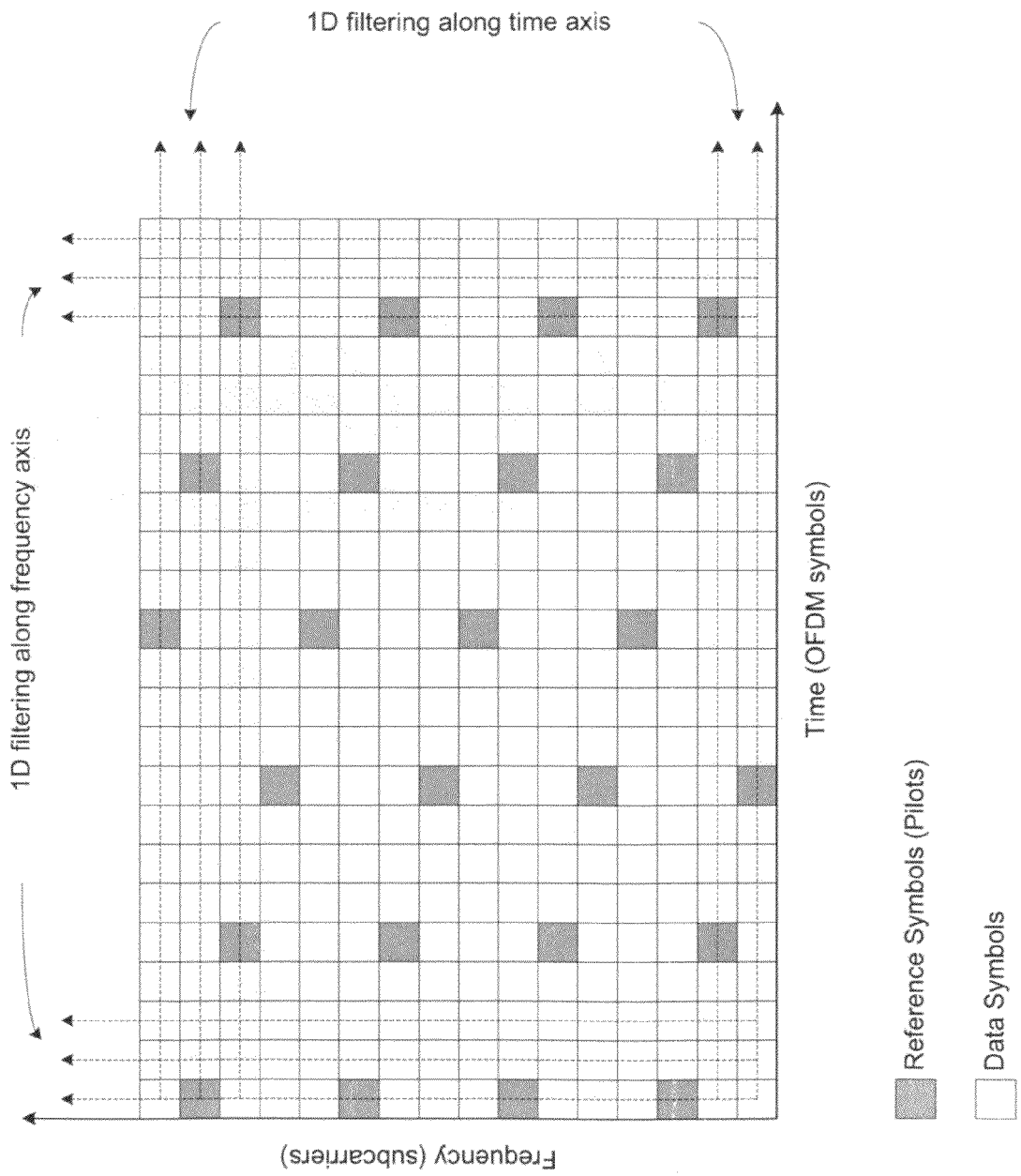
FIG. 8 illustrates separable 2D channel estimation with 1D filtering along time axis and 1D filtering along frequency axis in a time-frequency grid for an OFDM communication system.
Figure 9:
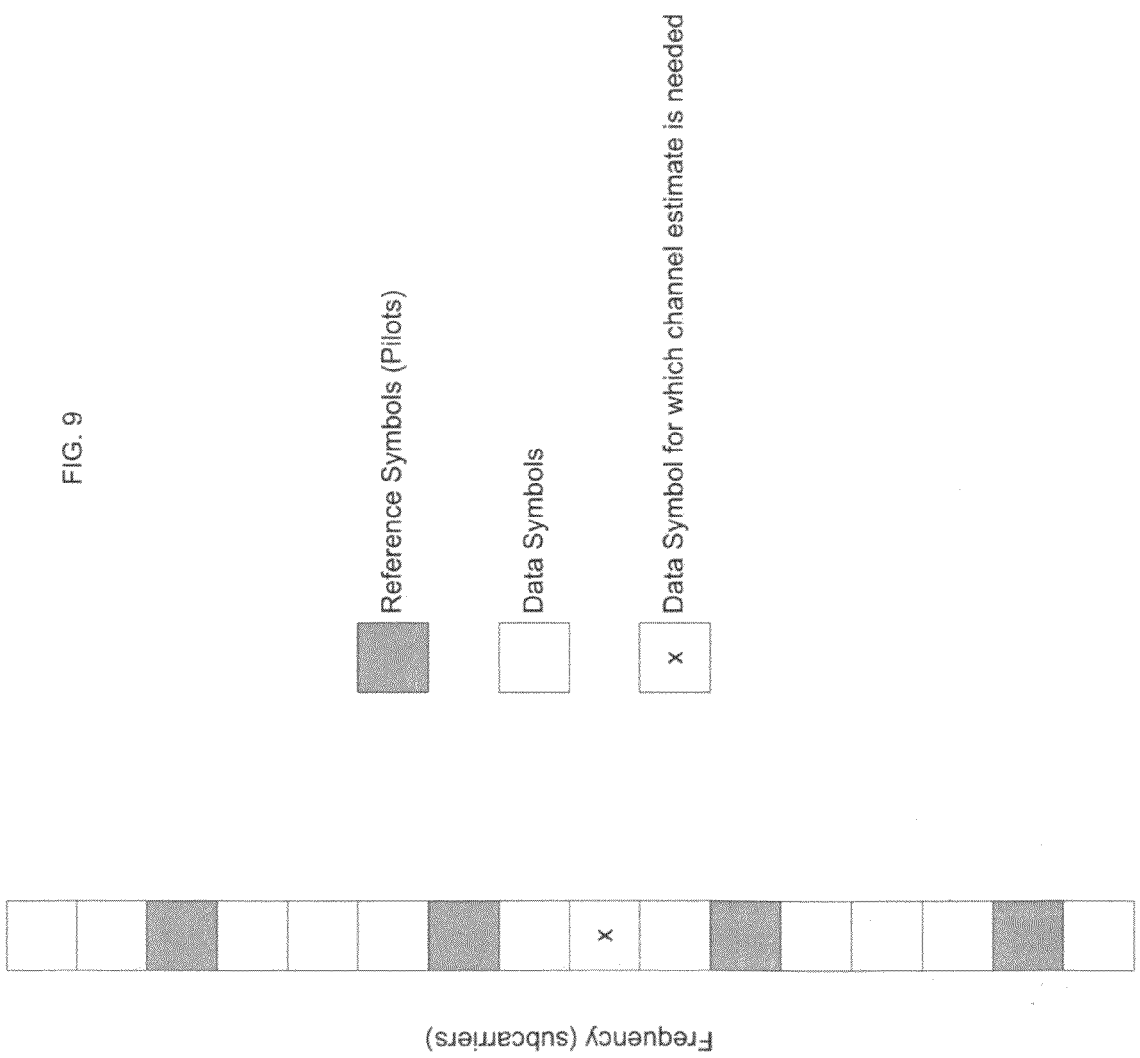
FIG. 9 illustrates 1D filtering for channel estimation along frequency axis for an OFDM communication system.

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used.

This application is related to U.S. patent application Ser. No. 12/157,791 ("the '791 application"), filed Jun. 13, 2008 and entitled "Adaptive joint channel estimation and data demodulation for OFDM systems," the entire disclosures of which is hereby expressly incorporated by reference herein. According to one aspect of the '791 application, the demodulated data symbols from a current OFDM symbol may also be used as reference symbols and incorporated into the channel estimation process for the remaining data subcarriers in the current OFDM symbol. The demodulated data symbols from current OFDM symbol may be used in addition to any pilots from past and/or current and/or future OFDM symbols and demodulated data symbols from past OFDM symbols.

As additional received symbols on data subcarriers of current OFDM symbol are demodulated, the demodulated data symbols become available as additional reference symbols for estimating the channel for the remaining data subcarriers in the current OFDM symbol. All the reference symbols, e.g., demodulated data symbols from past OFDM symbols, pilots from past and/or current and/or future OFDM symbols, and demodulated data symbols from current OFDM symbol, may be used in conjunction with each other to produce the channel estimate for the remaining data subcarriers in the current OFDM symbol.

In a method described in the '791 application, the channel estimation and data demodulation may be used in a joint manner to improve the channel estimation performance. The improved channel estimation in turn helps improve the data demodulation of the next data subcarrier within the current OFDM symbol. This adaptive process may be continued until all the data symbols in the current OFDM symbol are demodulated.

While such channel estimation techniques may provide an acceptable level of performance, it is desirable to provide improved channel estimation performance while reducing or keeping the same overhead in terms of bandwidth and power allocated to reference symbols. This is especially significant for receivers in highly varying propagation environments.

According to an aspect of the present invention, a channel estimate for a data subcarrier may be obtained by first obtaining two different channel estimates using different set of pilot and demodulated data symbols and then combining the two different channel estimates for the data subcarrier to obtain a new estimate that may have reduced channel estimation error. The two different channel estimates for a given data subcarrier may be obtained by employing either the method described in the '791 application or some other method that uses available reference symbols, including pilot and demodulated data symbols, from the current OFDM symbol in two different patterns as described herein.

The joint channel estimation and demodulation method described in the '791 application starts by performing the initial channel estimates on pilot subcarriers. Next the channel estimation is performed on one data subcarrier at a time by using the channel estimates of the pilot subcarriers and the channel estimates of the other available data subcarriers belonging to the same OFDM symbol. After estimating the channel of a given data subcarrier, the channel estimate is used to equalize and demodulate the data symbol from the subcarrier.

The demodulated data symbol is treated as a reference symbol like a pilot and in turn is used to refine the estimated channel of the same data subcarrier. The number of available channel estimates for each new data subcarrier within the same OFDM symbol grows after demodulating the data symbol received in each data subcarrier. The channel estimation and data demodulation work in a joint adaptive manner. The pattern in which the data subcarriers are demodulated affects channel estimates of the remaining data subcarriers.

According to an aspect of the present invention, referred to herein as a dual-pass joint channel estimation and demodulation method, first joint channel estimation and demodulation may be performed for data subcarriers in a first pattern. In the present example, let $h_{p1,i}$ denote the channel estimate for data subcarrier i when the joint channel estimation and demodulation is performed according to the first pattern. Next, joint channel estimation and demodulation may be performed in a second pattern. Let $h_{p2,i}$ denote the channel estimate for data subcarrier i when the joint channel estimation and demodulation is performed according to the second pattern.

After channel estimation according to the first and second patterns are complete, the dual-pass channel estimate for each data subcarrier is obtained by combining the two channel estimates obtained according to the two patterns. There are different methods that may be used to combine the two channel estimates. Two possible methods are as follows:

Average of the two channel estimates $$h_i = \frac{h_{p1,i} + h_{p2,i}}{2}$$

Weighted average of the two channel estimates $$h_i = \frac{\alpha \cdot h_{p1,i} + (1-\alpha) \cdot h_{p2,i}}{2}$$

where α is a weighing factor which may be based on the relative magnitudes of the two channel estimates.

The dual-pass channel estimate is then used to perform final equalization and demodulation on the data subcarrier.

The effect of noise and channel estimation errors may be different for the joint channel estimation and demodulation when performed according to different patterns for the same data subcarrier. In general, the estimation errors may be random but the true channel conditions are the same regardless of whether the channel estimation is performed according to the first pattern or the second pattern. The dual-pass channel estimate for a data subcarrier is obtained by combining the two channel estimates obtained using the joint channel estimation and demodulation method according to two different patterns. The dual-pass channel estimate may have the reduced channel estimation error.

Figure 10:
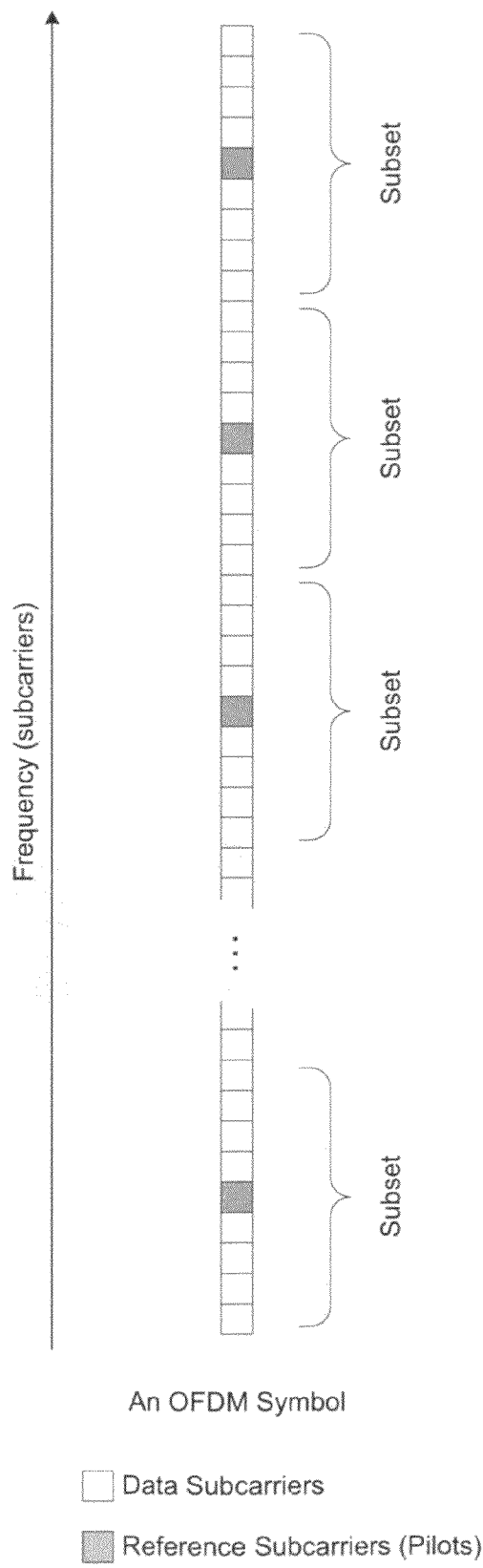
FIG. 10 illustrates an OFDM symbol in frequency domain consisting of a number of data subcarriers and pilot subcarriers that may be organized in subsets of subcarriers.

When the number of subcarriers in an OFDM symbol is large, the subcarriers may be typically organized into smaller subsets for channel estimation purposes as shown in FIG. 10. Only the subcarriers belonging to each subset are relevant for channel estimation for the subcarriers in that subset because the channel conditions are generally well correlated among subcarriers that are close to each other in frequency. The subsets may be formed such that there may be sufficient number of reference symbols, either pilot symbols or demodulated data symbols. The grouping of all the available subcarriers into subsets may be part of the communication protocol between a transmit entity and a receive entity. Alternatively, a receiver may group the available subcarriers into subsets according to the requirements of the channel estimation methods used by it.

According to another aspect of the invention the subset of subcarriers may be chosen such that it spans more than one OFDM symbol.

To better illustrate dual-pass adaptive channel estimation processes in accordance with aspects of the present invention, several examples are described below.

Example 1

Figure 11:
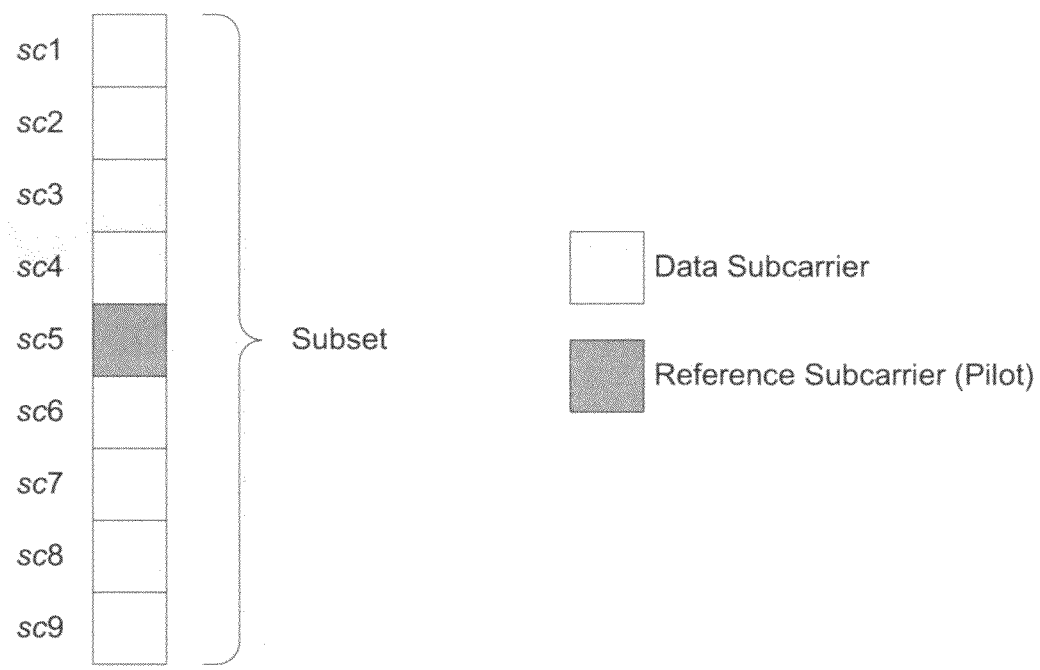
FIG. 11 illustrates a subset of subcarriers with eight data subcarriers and one pilot subcarrier considered in a first example in accordance with aspects of the present invention.

In this example, the number of subcarriers in a subset is chosen to be 9 with 1 pilot subcarrier and 8 data subcarriers. The subcarriers are labeled as sc1 through sc9 as shown in FIG. 11. In the chosen example, sc5 is the pilot subcarrier and the rest are data subcarriers.

First the channel estimation of the pilot subcarrier sc5 is performed and it is labeled as $h_5$ (see FIG. 12). The channel estimation for the pilot subcarrier may be performed using known techniques such as the Least Squares channel estimation method. For the pilot subcarrier, the channel estimate may not depend on the pattern since the modulation information for the pilot subcarrier is known a priori.

According to a first pattern, the channel estimate $h_5$ may be used to perform the channel estimation for the data subcarrier sc4 next. The channel estimation may be performed using known techniques as described herein. The initial channel estimate for the data subcarrier sc4 is labeled as $h'_{p1,4}$ in FIG. 12. According to an embodiment of a joint channel estimation and demodulation method in accordance with the invention, the channel estimate $h'_{p1,4}$ may be used to perform equalization and demodulation of the received symbol $r_4$ on data subcarrier sc4. The demodulated data symbol $\hat{x}_4$ may be used as a reference symbol to update the channel estimate for the data subcarrier sc4 and the updated channel estimate is labeled as $h_{p1,4}$. According to the first pattern, the channel estimates $h_5$ and $h_{p1,4}$ may be used to perform the channel estimation for the data subcarrier sc6 next. The initial channel estimate for sc6 is labeled as $h'_{p1,6}$. According to the present embodiment of a joint channel estimation and demodulation method, the channel estimate h'$_{p1,6}$ may be used to perform equalization and demodulation of the received symbol r$_6$ on subcarrier sc6. The demodulated data symbol $\hat{x}_6$ may be used as a reference symbol to update the channel estimate for the data subcarrier sc6 and the updated channel estimate is labeled as h$_{p1,6}$. This process may be continued for all the remaining data subcarriers in the subset as shown in table contained in FIG. 12. As can be seen from the table in FIG. 12, after performing joint channel estimation and demodulation for each subcarrier, the updated channel estimate of that subcarrier may be added to the set of available channel estimates as a basis for performing initial channel estimate for the next data subcarrier according to the first pattern.

According to a second pattern in this example, the channel estimate h$_5$ may be used to perform the channel estimation for the data subcarrier sc6 next. The channel estimation may be performed using known techniques as described herein. The initial channel estimate for the data subcarrier sc6 is labeled as h'$_{p2,6}$ (see FIG. 13). According to the present embodiment of a joint channel estimation and demodulation method of the invention, the channel estimate h'$_{p2,6}$ may be used to perform equalization and demodulation of the received symbol r$_6$ on data subcarrier sc6. The demodulated data symbol $\hat{x}_6$ may be used as a reference symbol to update the channel estimate for sc6 and the updated channel estimate is labeled as h$_{p2,6}$. According to the second pattern, the channel estimates h$_5$ and h$_{p2,6}$ may be used to perform the channel estimation for the data subcarrier sc4 next. The initial channel estimate for sc4 is labeled as h'$_{p2,4}$.

According to the present embodiment of a joint channel estimation and demodulation method, the channel estimate h'$_{p2,4}$ may be used to perform equalization and demodulation of the received symbol r$_4$ on data subcarrier sc4. The demodulated data symbol $\hat{x}_4$ may be used as a reference symbol to update the channel estimate for sc4 and the updated channel estimate is labeled as h$_{p2,4}$. This process may be continued for all the remaining data subcarriers in the subset as shown in table contained in FIG. 13. As can be seen from the table in FIG. 13, after performing the joint channel estimation and demodulation for each subcarrier, the updated channel estimate of that subcarrier may be added to the set of available channel estimates as a basis for performing initial channel estimate for the next data subcarrier according to the second pattern.

After both of the patterns of channel estimation according to this embodiment of the joint channel estimation and demodulation are complete, the dual-pass channel estimate for each data subcarrier may be obtained by combining the two channel estimates obtained from the two patterns as follows:

$$h_i = \frac{h_{p1,i} + h_{p2,i}}{2}$$

This dual-pass channel estimate may then be used to perform final equalization and demodulation for data subcarriers.

Example 2

Figure 14:
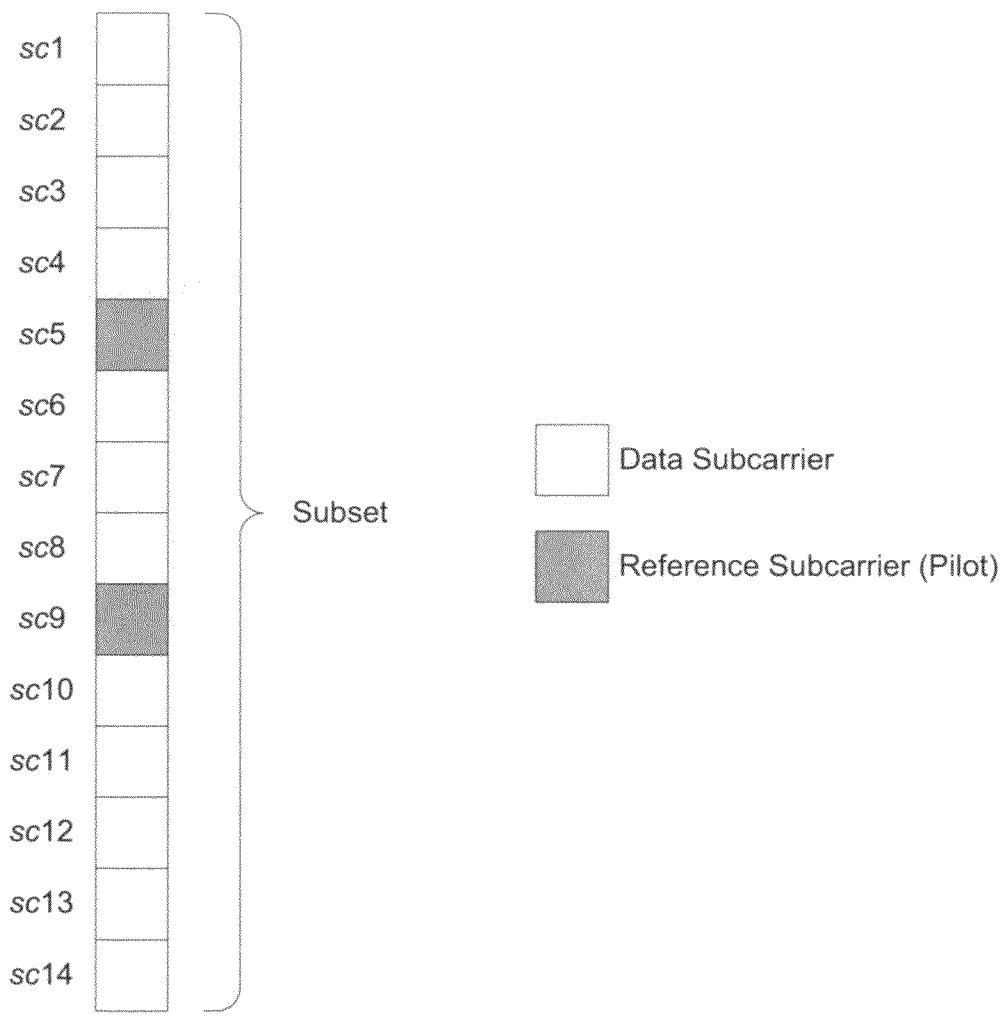
FIG. 14 illustrates a subset of subcarriers with 12 data subcarriers and two pilot subcarriers considered in another example in accordance with aspects of the present invention.

In this example, the number of subcarriers in a subset is chosen to be 14 with 2 pilot subcarriers and 12 data subcarriers. The subcarriers are labeled as sc1 through sc14 as shown in FIG. 14. In the chosen example, sc5 and sc9 are pilot subcarriers and the rest are data subcarriers.

First, the channel estimation of pilot subcarriers sc5 and sc9 may be performed and they are labeled as h$_5$ and h$_9$ respectively (see FIG. 15). The channel estimation for pilot subcarriers may be performed using known techniques such as the Least Squares channel estimation. For pilot subcarriers the channel estimates may not depend on the pattern since the modulation information for the pilot subcarriers is known a priori.

According to a first pattern, the channel estimates h$_5$ and h$_9$ may be used to perform channel estimation for the data subcarrier sc8 next. The channel estimation may be performed using known techniques as described herein. The initial channel estimate for data subcarrier sc8 is labeled as h'$_{p1,8}$. According to the present embodiment of a joint channel estimation and demodulation method in accordance with the invention, the channel estimate h'$_{p1,8}$ may be used to perform equalization and demodulation of the received symbol r$_8$ on data subcarrier sc8. The demodulated data symbol $\hat{x}_8$ may be used as a reference symbol to update the channel estimate for data subcarrier sc8 and the updated channel estimate is labeled as h$_{p1,8}$.

According to the first pattern, the channel estimates h$_5$, h$_9$ and h$_{p1,8}$ may be used to perform channel estimation for the data subcarrier sc6 next. The initial channel estimate for data subcarrier sc6 is labeled as h'$_{p1,6}$. According to the joint channel estimation and demodulation method, the channel estimate h'$_{p1,6}$ may be used to perform equalization and demodulation of the received symbol r$_6$ on data subcarrier sc6. The demodulated data symbol $\hat{x}_6$ may be used as a reference symbol to update the channel estimate for the data subcarrier sc6 and the updated channel estimate is labeled as h$_{p1,6}$. This process may be continued for all the remaining data subcarriers in the subset as shown in table contained in FIG. 15. As can be seen from the table, after performing the joint channel estimation and demodulation for each subcarrier, the updated channel estimate of that subcarrier may be added to the set of available channel estimates as a basis for performing initial channel estimate for the next data subcarrier according to the first pattern.

According to a second pattern, the channel estimates h$_5$ and h$_9$ may be used to perform channel estimation for the data subcarrier sc6 next. The channel estimation may be performed using techniques known in the literature as described in the background section. The initial channel estimate for sc6 is labeled as h'$_{p2,6}$ (see FIG. 16). According to the present embodiment of a joint channel estimation and demodulation method, the channel estimate h'$_{p2,6}$ may be used to perform equalization and demodulation of the received symbol r$_6$ on data subcarrier sc6. The demodulated data symbol $\hat{x}_6$ may be used as a reference symbol to update the channel estimate for sc6 and the updated channel estimate is labeled as h$_{p2,6}$. According to the second pattern, the channel estimates h$_5$, h$_9$ and h$_{p2,6}$ may be used to perform channel estimation for the data subcarrier sc8 next. The initial channel estimate for data subcarrier sc8 is labeled h'$_{p2,8}$. According to the joint channel estimation and demodulation method, the channel estimate h'$_{p2,8}$ is used to perform equalization and demodulation of the received symbol r$_8$ on data subcarrier sc8. The demodulated data symbol $\hat{x}_8$ may be used as a reference symbol to update the channel estimate for data subcarrier sc8 and the new channel estimate is labeled as h$_{p2,8}$. This process may be continued for all the remaining data subcarriers in the subset as shown in table contained in FIG. 16. As can be seen from the table, after performing joint channel estimation and demodulation for each subcarrier, the updated channel estimate of that subcarrier may be added to the set of available channel estimates as a basis for performing initial channel estimate for the next data subcarrier according to the second pattern.

After both the patterns of channel estimation according to the joint channel estimation and demodulation are complete, the dual-pass channel estimate for each data subcarrier may be obtained by combining the two channel estimates obtained from the first and second patterns as follows:

$$h_i = \frac{h_{p1,i} + h_{p2,i}}{2}$$

This dual-pass channel estimate may then be used to perform final equalization and demodulation for data subcarriers.

Example 3

Figure 17:
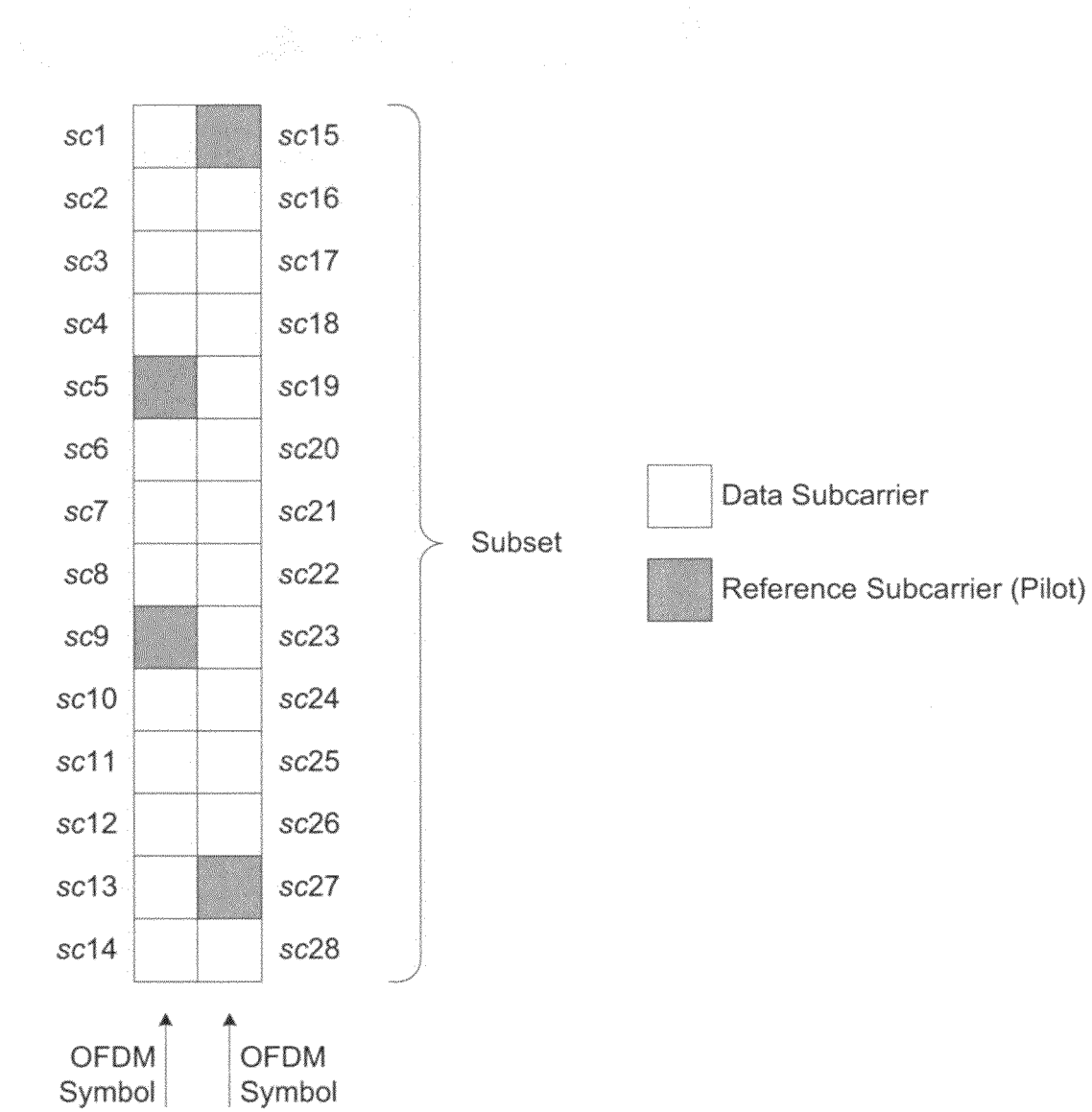
FIG. 17 illustrates a subset of subcarriers with 24 data subcarriers and four pilot subcarriers over two OFDM symbols considered in a further example in accordance with aspects of the present invention.

In this example, the subset contains 28 subcarriers, 14 in one ODFM symbol and the other 14 from the adjacent OFDM symbol as shown in FIG. 17. The subset contains 4 pilot subcarriers, 2 pilot subcarriers from each OFDM symbol and 24 data subcarriers, 12 data subcarriers from each OFDM symbol. The subcarriers are labeled as sc1 through sc28 as shown in FIG. 17. In the chosen example, sc5, sc9, sc15, and sc27 are pilot subcarriers and the rest are data subcarriers. First the channel estimation of pilot subcarriers may be performed and then the joint channel estimation and demodulation method may be applied according to the first and second patterns as shown in FIG. 18 and FIG. 19, respectively.

After both the patterns of channel estimation according to the joint channel estimation and demodulation are complete, the dual-pass channel estimate for each data subcarrier may be obtained by combining the two channel estimates obtained from the two patterns as follows:

$$h_i = \frac{h_{p1,i} + h_{p2,i}}{2}$$

This dual-pass channel estimate may then be used to perform final equalization and demodulation for data subcarriers.

In the above examples, the patterns are chosen such that the data subcarriers that are closer to the pilot subcarrier(s) may be considered earlier in the joint channel estimation and demodulation process. This is because the channel estimates of the pilot subcarriers are more reliable and more correlated to the channel estimates of the data subcarriers that are adjacent to the pilot subcarriers. However, there are many possible patterns that may be considered for the dual-pass channel estimation method. The patterns may be chosen such that the channel estimation error of the dual-pass channel estimate is minimum.

Figure 20A:
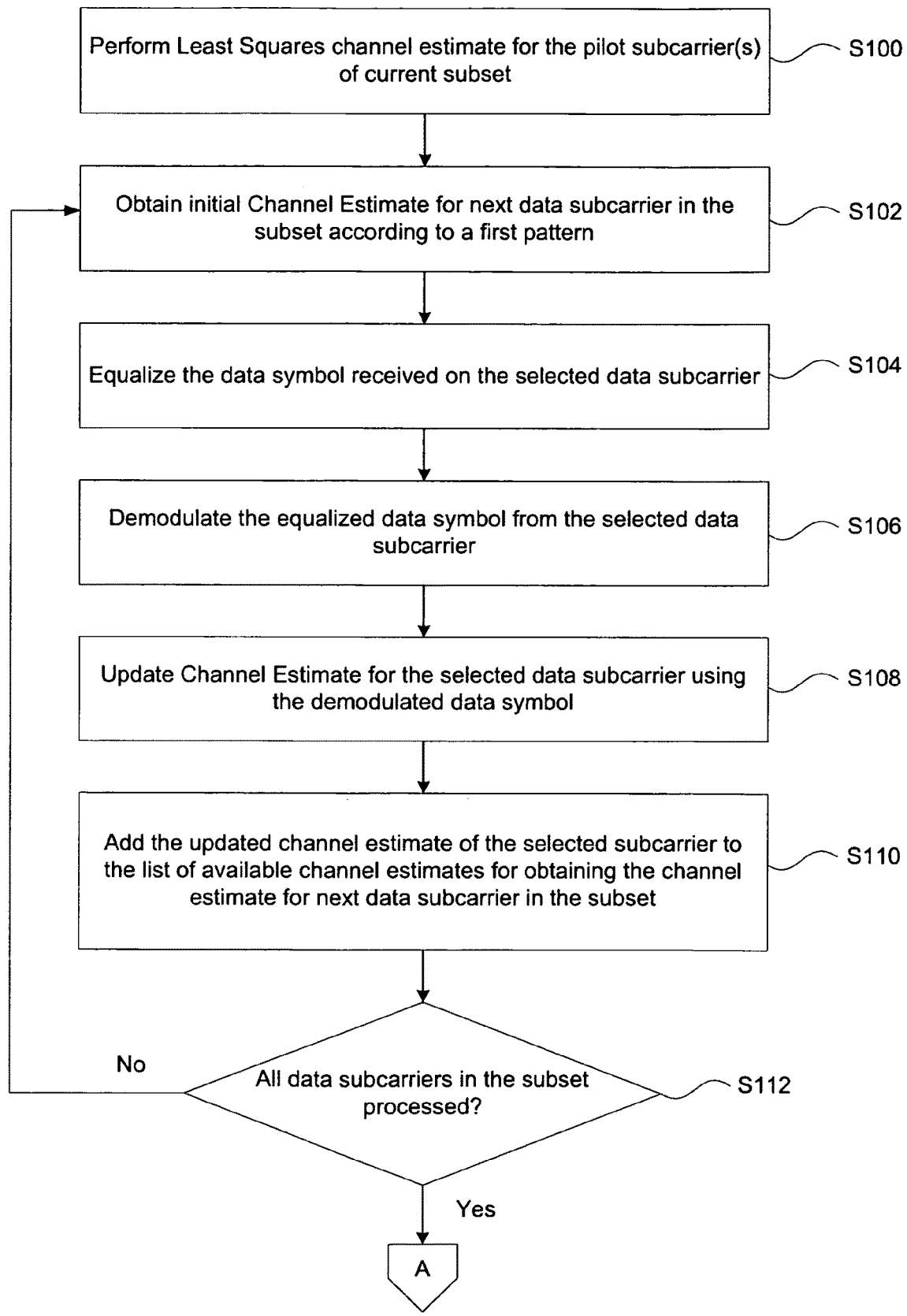
FIGS. 20A-20C present an exemplary series of flow diagrams representing a dual-pass joint channel estimation and demodulation method in accordance with aspects of the present invention.
Figure 20B:
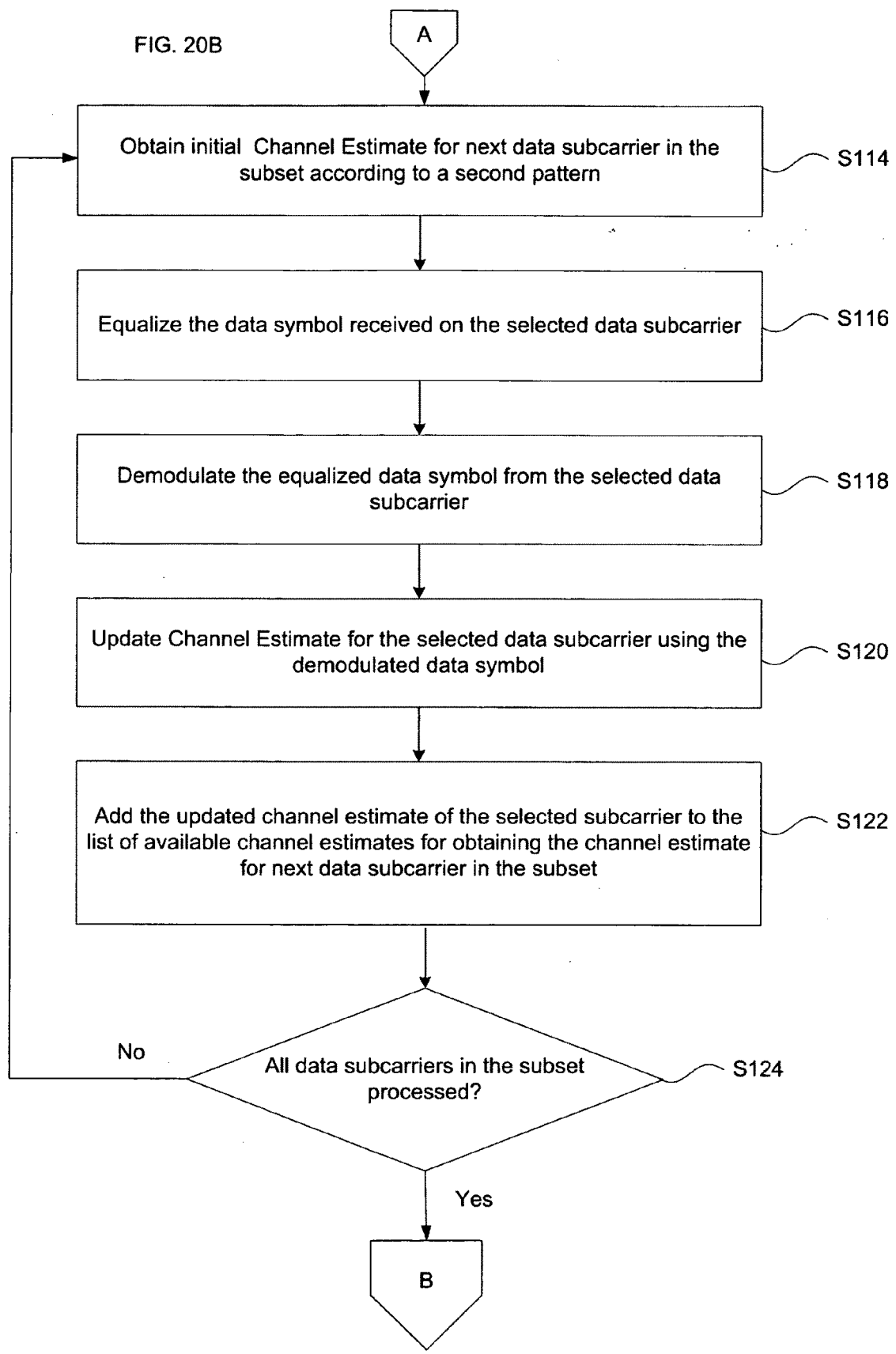
Figure 20C:
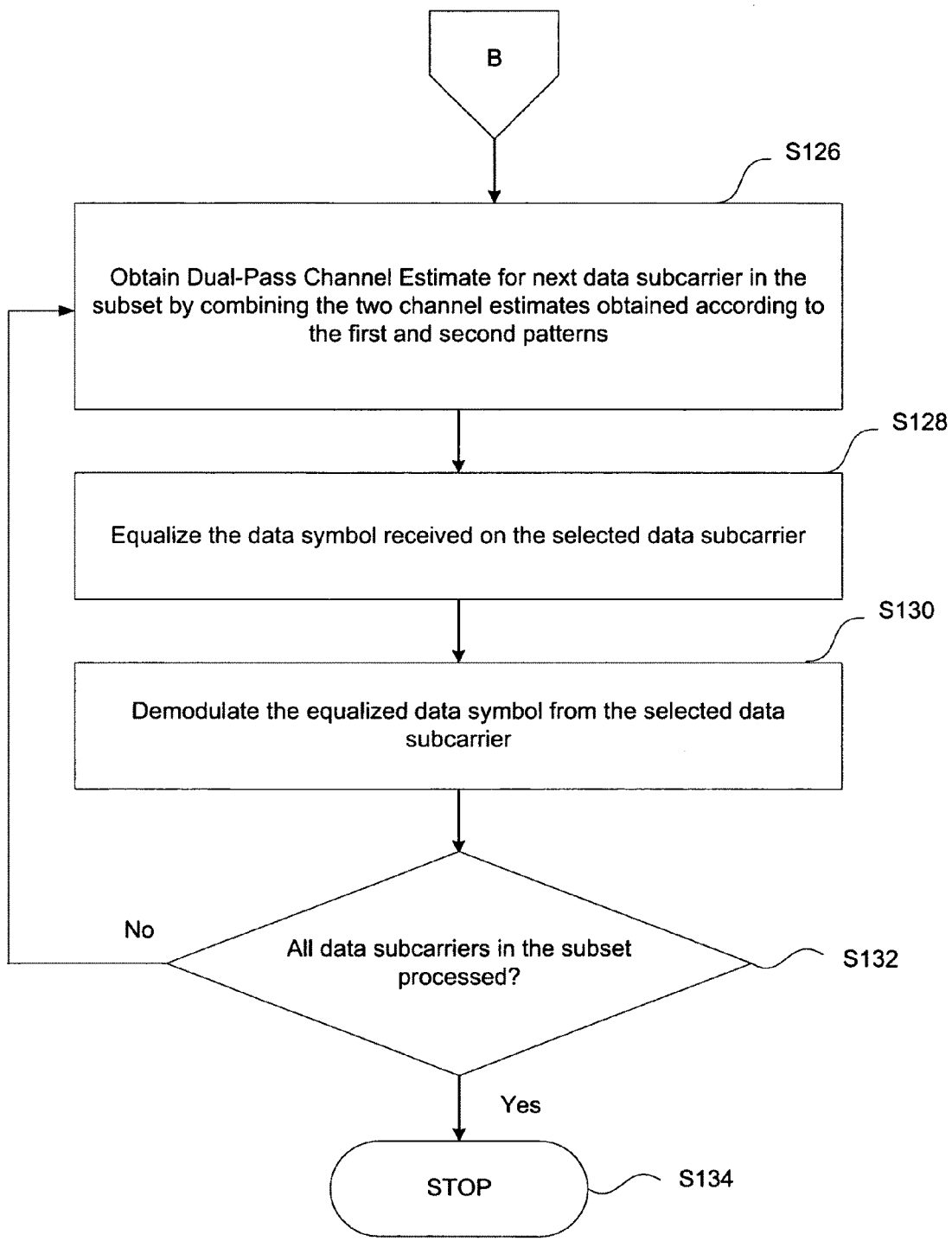

A dual-pass joint channel estimation and demodulation method in accordance with aspects of the present invention is discussed with regard to FIGS. 20A-C.

As shown in FIG. 20A at step S100, a channel estimate such as a least squares channel estimate may be performed for the pilot subcarrier(s) of a current subset of subcarriers in one or more data symbols such as OFDM data symbols. The subset may contain some or all of the subcarriers in the data symbol.

Next, at step S102, an initial channel estimate for a next data subcarrier in the current subset is obtained according to a first pattern. The first pattern preferably includes a first predetermined ordering of data subcarriers. The initial channel estimate for the next data subcarrier is desirably based upon available channel estimates for some or all of the pilot subcarrier(s) and other data subcarrier(s) which have already been estimated. For instance, referring to FIG. 12, the initial channel estimate ($h'_{p1,4}$) for data subcarrier 4 (sc4) is based solely on the available channel estimate (h5) for the pilot subcarrier 5 (sc5).

As shown at step S104, the data symbol received on a selected data subcarrier may be equalized using the channel estimate from step S102. Thus, referring to the first example above with regard to FIG. 12, $h'_{p1,4}$ may be used to perform equalization on received data symbol $r_4$ on data subcarrier sc4. And as shown at step S106, the equalized data symbol from the selected data subcarrier may be demodulated. For instance, in the above example, the resultant demodulated data symbol is $\hat{x}_4$.

At step S108, the channel estimate for the selected data subcarrier is updated using the demodulated data symbol of step S106. And at step S110, the updated channel estimate of the selected data subcarrier is added to a list of available channel estimates for obtaining the channel estimate for a next data subcarrier in the subset of subcarriers of the data symbol. This may be seen in the second column from the left in the table of FIG. 12.

At step S112, a decision is made as to whether all data subcarriers in the subset have been processed according to the first pattern. If they have not, the process returns to step S102. If they have, then the process continues at step S114 as shown in FIG. 20B. Here, at step S114, an initial channel estimate for a next data subcarrier in the current subset is obtained according to a second pattern. The second pattern preferably includes a second predetermined ordering of data subcarriers different from the first predetermined ordering of data subcarriers.

The initial channel estimate for the next data subcarrier is desirably based upon available channel estimates for some or all of the pilot subcarrier(s) and other data subcarrier(s) which have already been estimated in accordance with the second predetermined ordering. For instance, referring to FIG. 13, the initial channel estimate ($h'_{p2,6}$) for data subcarrier 6 (sc6) is based solely on the available channel estimate (h5) for the pilot subcarrier 5 (sc5).

As shown at step S116, the data symbol received on a selected data subcarrier may be equalized using the channel estimate from step S114. Thus, referring to the example above with regard to FIG. 13, $h'_{p2,6}$ may be used to perform equalization on received data symbol $r_6$ on data subcarrier sc6. And as shown at step s118, the equalized data symbol from the selected data subcarrier may be demodulated. For instance, in the above example, the resultant demodulated data symbol is $\hat{x}_6$.

At step S120, the channel estimate for the selected data subcarrier is updated using the demodulated data symbol of step S118. And at step S122, the updated channel estimate of the selected data subcarrier according to the second pattern is added to a list of available channel estimates for obtaining the channel estimate for a next data subcarrier in the subset of subcarriers of the data symbol. This may be seen in the second column from the left in the table of FIG. 13.

At step S124, a decision is made as to whether all data subcarriers in the subset have been processed according to the second pattern. If they have not, the process returns to step S114. If they have, then the process continues at step S126 as shown in FIG. 20C. Here, a dual-pass channel estimate for a next data subcarrier in the subset is obtained by combining the two channel estimates for that data subcarrier, which were obtained according to the first and second patterns. This may be done, as discussed above, using a straight average of the two channel estimates. Alternatively, a weighted average of the two channel estimates may be used. Other combinations of the two channel estimates are also possible.

Next, the dual-pass channel estimate may be used to equalize the data symbol received on the selected data subcarrier as shown in step S128 and the equalized data symbol may be demodulated as shown in step S130. A decision is made at step S132 as to whether all data subcarriers have been processed. If they have not, the process returns to step S126. If the subcarriers have all been processed, the process may terminate at step S134.

Aspects of the invention as described herein may be applied to a subset of subcarriers in a symbol such as an OFDM symbol or may be applied to all the subcarriers in the symbol.

The dual-pass joint channel estimation and demodulation method may be applied to (OFDM) symbols that may or may not include pilot subcarriers. The initial channel estimates for the dual-pass joint channel estimation and demodulation method may use one or the combination of any of the following:

Channel estimates from previous OFDM symbols
Demodulated data symbols from previous OFDM symbols as reference symbols
Pilot subcarriers from current and/or previous OFDM symbols The invention described herein may be used for a subset of subcarriers composed of different number of subcarriers and different pilot subcarrier arrangements within the subset.

In the examples described herein, two patterns have been considered for a dual-pass joint channel estimation and demodulation method. However, the invention is not limited to two patterns and may be extended to three or more patterns by appropriate modifications to the methods described herein.

The dual-pass joint channel estimation and demodulation methods in accordance with the present invention have the following benefits. More accurate channel estimation for OFDM systems and thus improved data demodulation and increased throughput of the system. Improved demodulation leads to reduced error rate which in turn reduces retransmissions. This leads to improved bandwidth efficiency for the communication system and reduced power consumption for the receiver. The reduction in power consumption is a significant advantage for battery operated client terminals. Furthermore, the number of pilot subcarriers in an OFDM system may be reduced while maintaining the required performance. This improves the bandwidth efficiency of the communication system.

Figure 21:
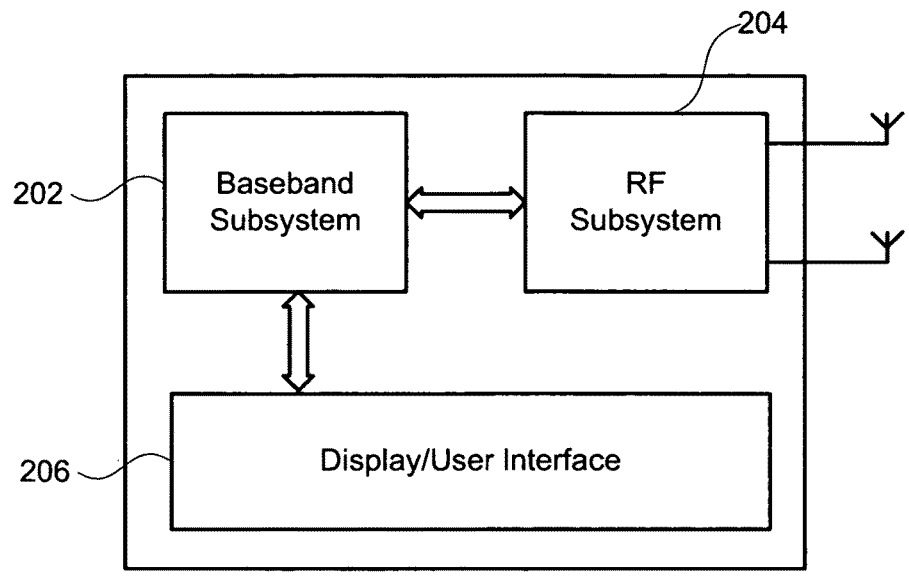
FIG. 21 illustrates a diagram of a wireless mobile station for use with aspects of the present invention.

By way of example only, the above-described processes may be implemented in a user device such as a wireless mobile station ("MS") implementing OFDM. As shown in FIG. 21, MS 200 may include a baseband subsystem 202 and a radio frequency ("RF") subsystem 204. A display/user interface 206 provides information to and receives input from the user. By way of example, the user interface may include one or more actuators, a speaker and a microphone.

Figure 22:
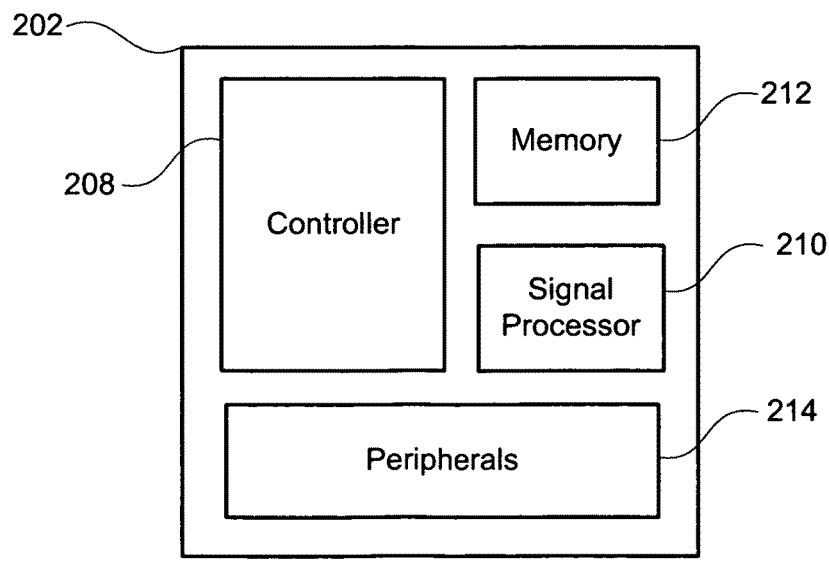
FIG. 22 illustrates a baseband subsystem for use with aspects of the present invention.

As shown in FIG. 22, the baseband subsystem 202 may include a controller 208 such as a microcontroller or other processor. The controller 208 desirably handles overall operation of the MS 200, including management of the RF subsystem 204. This may be done by software or firmware running on the controller 208. Such software/firmware may embody any methods in accordance with aspects of the present invention.

A signal processor 210 may be used to process samples from the RF subsystem 204 or other information sent or received by the MS 200. The signal processor 210 may be a stand-alone component or may be part of the controller 208. Memory 212 may be shared by or reserved solely for one or both of the controller 208 and the signal processor 210. For instance, signal processing algorithms may be stored in a non-volatile section of memory 212 while coefficients and other data parameters may be stored in RAM. Peripherals 214 such as a full or partial keyboard, video or still image display, audio interface, etc may be employed and managed through the controller 208.

The RF subsystem 204 preferably provides two-way communication operation. It may include one or more receivers/receive chains, a transmitter, a synthesizer, a power amplifier, and one or more antennas operatively coupled together to enable OFDM or similar communication. The receive chain(s) is operable to receive signals from one or more channels in a wireless communication network. Aspects of the present invention may be implemented in firmware of the signal processor 210 and/or the controller 208 of the baseband subsystem. In another alternative, aspects of the present invention may also be implemented as a combination of firmware and hardware of the baseband subsystem.

In another alternative, aspects of the present invention may be implemented in network elements in addition to or distinct from implementation in mobile stations. For instance, one or more base stations of a wireless communication network, such as an OFDM-based wireless network, may employ a baseband subsystem and/or an RF subsystem such as those detailed above. Software and/or firmware embodying any of the methods in accordance with aspects of the present invention may be executed by a controller or signal processor of the baseband subsystem or the RF subsystem. In another alternative, aspects of the present invention may also be implemented as a combination of firmware and hardware of the baseband subsystem.

In accordance with such aspects of the present invention, the dual-pass adaptive channel estimation may be applied to various communication systems such as systems based on an IEEE 802.16 wireless communication standard, an IEEE 802.11 wireless communication standard, an IEEE 802.20 wireless communication standard, a T-DMB wireless communication standard, a DVB-T wireless communication standard, a DVB-H wireless communication standard, a MediaFLO wireless communication standard, a Long Term Evolution of 3G-type wireless communication standard, cable modem standard, DSL standard, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

The invention claimed is:

1. A channel estimation and data demodulation method for use in a communication system, the method comprising:
performing a first channel estimate for a subset of data subcarriers of a symbol received by a receiver in the communication system according to a first pattern, the symbol including one or more reference subcarriers, wherein the first channel estimate is performed according to the first pattern by initially estimating a first data subcarrier from the subset of data subcarriers along a frequency axis thereof, the first data subcarrier being adjacent to one of the one or more reference subcarriers along the frequency axis;

performing a second channel estimate on the same subset of data subcarriers along the frequency axis according to a second pattern, the second pattern being different than the first pattern, wherein the second channel estimate is performed according to the second pattern by initially estimating a second data subcarrier from the same subset of data subcarriers along the frequency axis, the second data subcarrier being adjacent to the same or a different one of the one or more reference subcarriers used in the channel estimation with the first pattern, the second data subcarrier being different than the first data subcarrier;

obtaining a multi-pass channel estimate for each of the data subcarriers in the same subset along the frequency axis by combining the first and second channel estimates;

equalizing the data subcarriers based on the multi-pass channel estimate thereof; and demodulating the equalized data subcarriers to obtain demodulated data.

2. The method of claim 1, wherein:
the one or more reference subcarriers includes one or more pilot subcarriers;
performing the first channel estimate comprises:
   performing a channel estimate for any of the pilot subcarriers associated with the subset; and
   initially estimating the first data subcarrier according to the first pattern using the channel estimate for any of the associated pilot subcarriers.

3. The method of claim 2, wherein the method further comprises performing an initial equalization on a data symbol received on the first data subcarrier.

4. The method of claim 3, wherein the method further comprises:
performing an initial demodulation of the equalized data symbol; and
updating the initial estimate for the first data subcarrier using the initial demodulation.

5. The method of claim 2, wherein performing the second channel estimate comprises initially estimating the second data subcarrier according to the second pattern using the channel estimate for any of the associated pilot subcarriers.

6. The method of claim 1, wherein the first and second channel estimates are combined by averaging the estimates together.

7. The method of claim 6, wherein the averaging is a weighted average of the first and second channel estimates.

8. The method of claim 1, wherein the subset comprises all of the data subcarriers of the symbol.

9. The method of claim 1, wherein the symbol is an OFDM symbol.

10. The method of claim 1, wherein the subset of data subcarriers is selected from the symbol by the receiver.

11. The method of claim 1, further comprising performing a third channel estimate for the subset of data subcarriers of the symbol according to a third pattern, the third pattern being different than the first and second patterns, wherein the multi-pass channel estimate for each of the data subcarriers in the subset is obtained by combining the first, second and third channel estimates.

12. The method of claim 1, wherein the symbol does not include any pilot subcarriers.

13. A non-transitory recording medium recorded with a computer program for execution by a processor to perform a channel estimation and data demodulation process in a communication system, the process comprising:

performing a first channel estimate for a subset of data subcarriers of a symbol in the communication system according to a first pattern, the symbol including one or more reference subcarriers, wherein the first channel estimate is performed according to the first pattern by initially estimating a first data subcarrier from the subset of data subcarriers along a frequency axis thereof, the first data subcarrier being adjacent to one of the one or more reference subcarriers along the frequency axis;

performing a second channel estimate on the same subset of data subcarriers along the frequency axis according to a second pattern, the second pattern being different than the first pattern, wherein the second channel estimate is performed according to the second pattern by initially estimating a second data subcarrier from the same subset of data subcarriers along the frequency axis, the second data subcarrier being adjacent to the same or a different one of the one or more reference subcarriers used in the channel estimation with the first pattern, the second data subcarrier being different than the first data subcarrier;

obtaining a multi-pass channel estimate for each of the data subcarriers in the same subset along the frequency axis by combining the first and second channel estimates;

equalizing the data subcarriers based on the multi-pass channel estimate thereof; and demodulating the equalized data subcarriers to obtain demodulated data.

14. The non-transitory recording medium of claim 13, wherein:
the one or more reference subcarriers includes one or more pilot subcarriers;
performing the first channel estimate comprises:
   performing a channel estimate for any of the pilot subcarriers associated with the subset; and
   initially estimating the data subcarrier according to the first pattern using the channel estimate for any of the associated pilot subcarriers.

15. The non-transitory recording medium of claim 14, wherein the process further comprises performing an initial equalization on a data symbol received on the first data subcarrier.

16. The non-transitory recording medium of claim 15, wherein the process further comprises:
performing an initial demodulation of the equalized data symbol; and
updating the initial estimate for the first data subcarrier using the initial demodulation.

17. The non-transitory recording medium of claim 14, wherein performing the second channel estimate comprises initially estimating the second data subcarrier according to the second pattern using the channel estimate for any of the associated pilot subcarriers.

18. A wireless communication device for use on a wireless communication network, the wireless communication device comprising:
a baseband subsystem including a processor for managing operations of the wireless communication device; and
a radio frequency subsystem operatively connected to the baseband subsystem, the radio frequency subsystem including at least one receive chain being configured to receive symbols from at least one channel of the wireless communication network;
wherein the processor is configured to:
   perform a first channel estimate for a subset of data subcarriers of one of the symbols according to a first pattern, the symbol including one or more reference subcarriers, wherein the first channel estimate is performed according to the first pattern by initially estimating a first data subcarrier from the subset of data subcarriers along a frequency axis thereof, the first data subcarrier being adjacent to one of the one or more reference subcarriers along the frequency axis;

perform a second channel estimate on the same subset of data subcarriers along the frequency axis according to a second pattern, the second pattern being different than the first pattern, wherein the second channel estimate is performed according to the second pattern by initially estimating a second data subcarrier from the same subset of data subcarriers along the frequency axis, the second data subcarrier being adjacent to the same or a different one of the one or more reference subcarriers used in the channel estimation with the first pattern, the second data subcarrier being different than the first data subcarrier;

obtain a multi-pass channel estimate for each of the data subcarriers in the same subset along the frequency axis by combining the first and second channel estimates;

equalize the data subcarriers based on the multi-pass channel estimate thereof; and demodulate the equalized data subcarriers to obtain demodulated data.

19. The wireless communication device of claim 18, wherein the wireless communication network employs an OFDM modulation scheme and the symbols are OFDM symbols.

20. The wireless communication device of claim 18, wherein the device is a mobile station.

21. The wireless communication device of claim 18, wherein the device is a base station of the wireless communication network.

22. The wireless communication device of claim 18, wherein:
the one or more reference subcarriers includes one or more pilot subcarriers; and
the processor is further configured to perform the first channel estimate by performing a channel estimate for any of the pilot subcarriers associated with the subset and initially estimating the first data subcarrier according to the first pattern using the channel estimate for any of the associated pilot subcarriers.

23. The wireless communication device of claim 22, wherein the processor is further configured to perform an initial equalization on a data symbol received on the first data subcarrier.

24. The wireless communication device of claim 23, wherein the processor is further configured to:
perform an initial demodulation of the equalized data symbol; and
update the initial estimate for the first data subcarrier using the initial demodulation.

25. The wireless communication device of claim 22, wherein the processor is further configured to perform the second channel estimate by initially estimating the second data subcarrier according to the second pattern using the channel estimate for any of the associated pilot subcarriers.

* * * * *